(12) United States Patent
Kishigami

(10) Patent No.: US 10,890,652 B2
(45) Date of Patent: Jan. 12, 2021

(54) RADAR APPARATUS

(71) Applicant: Panasonic Corporation, Osaka (JP)

(72) Inventor: Takaaki Kishigami, Tokyo (JP)

(73) Assignee: Panasonic Corporation, Osaka (JP)

( * ) Notice: Subject to any disclaimer, the term of this patent is extended or adjusted under 35 U.S.C. 154(b) by 364 days.

(21) Appl. No.: 15/703,788

(22) Filed: Sep. 13, 2017

(65) Prior Publication Data

US 2018/0088224 A1    Mar. 29, 2018

(30) Foreign Application Priority Data

Sep. 26, 2016  (JP) ................ 2016-187200

(51) Int. Cl.
| | |
|---|---|
| *G01S 13/34* | (2006.01) |
| *G01S 13/931* | (2020.01) |
| *G01S 7/28* | (2006.01) |
| *G01S 13/28* | (2006.01) |
| *G01S 13/42* | (2006.01) |
| *H01Q 21/08* | (2006.01) |
| *G01S 7/02* | (2006.01) |
| *G01S 7/282* | (2006.01) |

(Continued)

(52) U.S. Cl.
CPC ............. *G01S 13/34* (2013.01); *G01S 7/02* (2013.01); *G01S 7/28* (2013.01); *G01S 7/282* (2013.01); *G01S 7/285* (2013.01); *G01S 13/288* (2013.01); *G01S 13/42* (2013.01); *G01S 13/46* (2013.01); *G01S 13/931* (2013.01); *H01Q 21/06* (2013.01); *H01Q 21/08* (2013.01); *H04B 7/10* (2013.01); *H01Q 3/26* (2013.01)

(58) Field of Classification Search
CPC .......... G01S 7/28; G01S 13/42; G01S 13/931; G01S 13/02; G01S 13/288
See application file for complete search history.

(56) References Cited

U.S. PATENT DOCUMENTS

| 5,933,109 A | 8/1999 | Tohya et al. |
| 8,466,829 B1 * | 6/2013 | Volman ................... G01S 3/48 342/133 |

(Continued)

FOREIGN PATENT DOCUMENTS

| JP | 2016-090431 A | 5/2016 |
| JP | 2016-090432 A | 5/2016 |

OTHER PUBLICATIONS

Jian Li et al., "MIMO Radar with Colocated Antennas", Signal Processing Magazine, IEEE, vol. 24, Issue:5, Oct. 15, 2007, pp. 106-114.

(Continued)

*Primary Examiner* — Marc Anthony Armand
(74) *Attorney, Agent, or Firm* — Seed IP Law Group LLP

(57) ABSTRACT

A radar apparatus includes: a radar transmitter that transmits a plurality of radar signals while switching among a plurality of transmitting subarrays; and a radar receiver that receives reflected-wave signals produced by the plurality of radar signals being reflected by a target, the plurality of radar signals being transmitted from the respective transmitting subarrays. In the radar apparatus, each of the plurality of transmitting subarrays includes a plurality of transmitting antennas, and adjacent ones of the plurality of transmitting subarrays share at least one of the plurality of transmitting antennas with each other.

9 Claims, 20 Drawing Sheets

(51) Int. Cl.
*G01S 7/285* (2006.01)
*G01S 13/46* (2006.01)
*H01Q 21/06* (2006.01)
*H04B 7/10* (2017.01)
*H01Q 3/26* (2006.01)

(56) References Cited

U.S. PATENT DOCUMENTS

| | | | | |
|---|---|---|---|---|
| 8,665,137 | B2* | 3/2014 | Wintermantel | G01S 7/032 342/59 |
| 2003/0164791 | A1* | 9/2003 | Shinoda | H01Q 25/02 342/70 |
| 2011/0063158 | A1* | 3/2011 | Kondou | H01Q 3/24 342/27 |
| 2015/0323652 | A1* | 11/2015 | Huang | G01S 7/42 342/175 |
| 2016/0054439 | A1* | 2/2016 | Brookner | G01S 13/42 342/26 R |
| 2016/0365631 | A1* | 12/2016 | Huang | H04B 7/0413 |
| 2016/0377705 | A1* | 12/2016 | Zack | G01S 7/414 342/21 |
| 2019/0058262 | A1* | 2/2019 | Maruyama | H01Q 3/24 |

OTHER PUBLICATIONS

Partial European Search Report (R.64 EPC), dated Feb. 27, 2018, for the related European Patent Application No. 17191327.0-1206, 15 pages.

\* cited by examiner

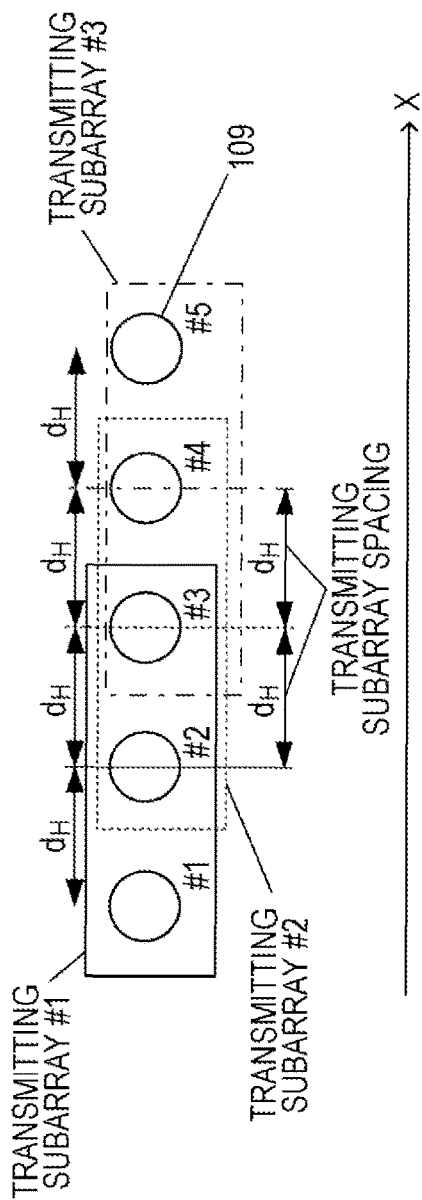
FIG. 8A
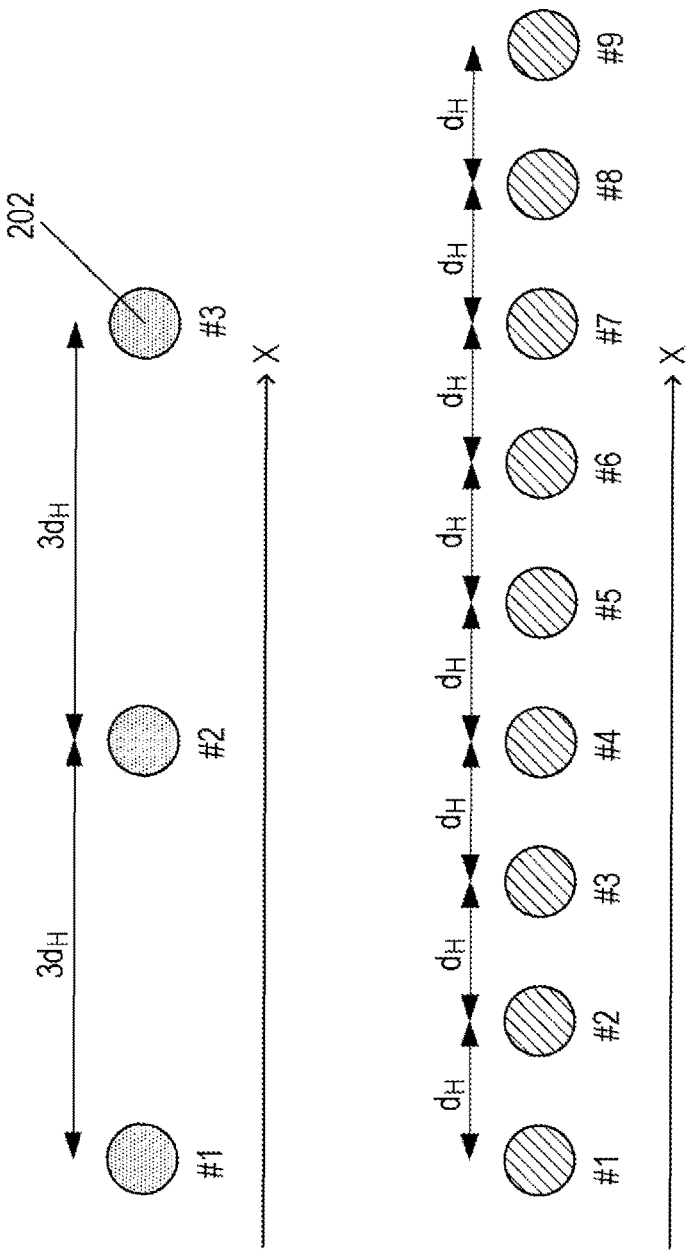
FIG. 8B
FIG. 8C

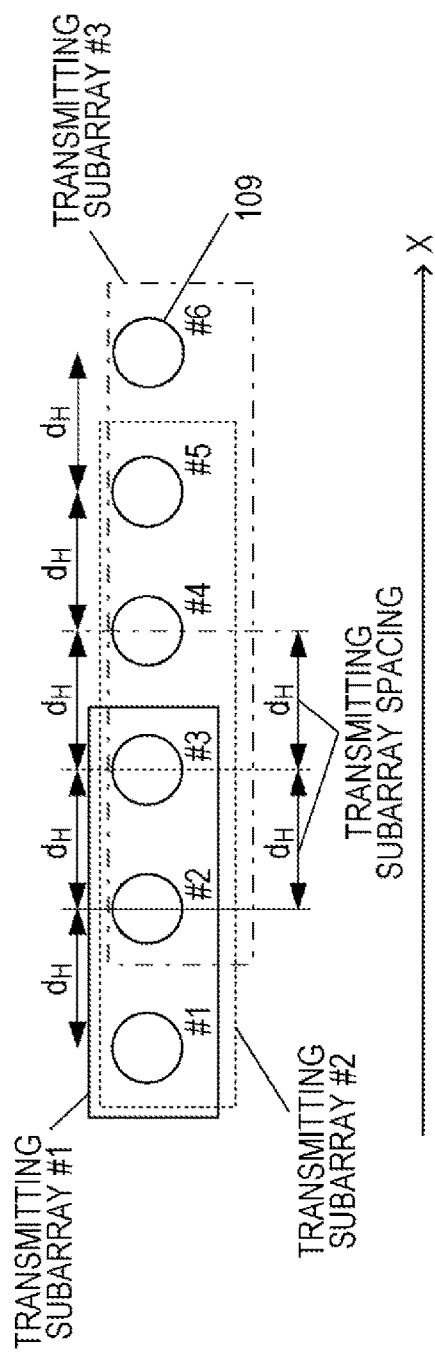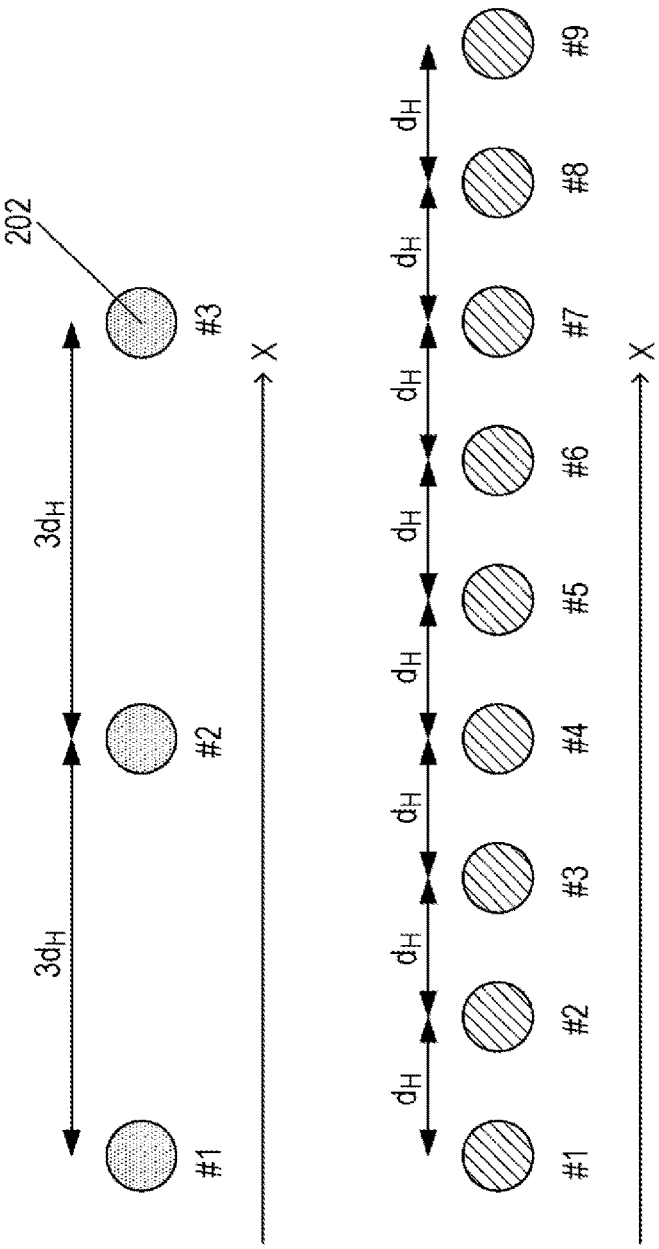
FIG. 9A
FIG. 9B
FIG. 9C

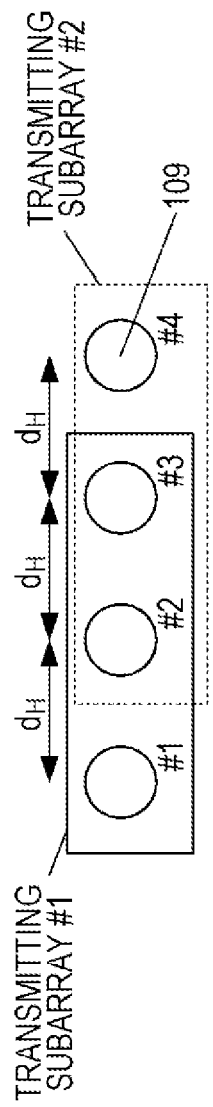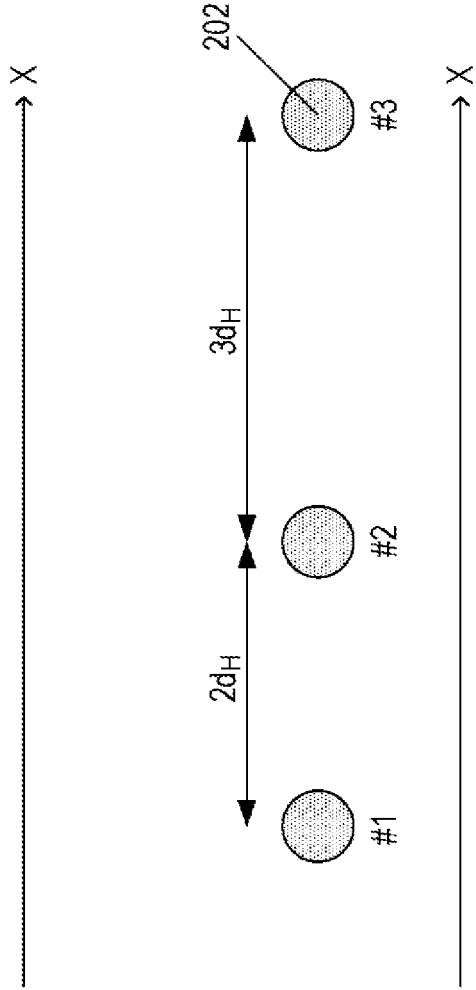
FIG. 17A  FIG. 17B  FIG. 17C

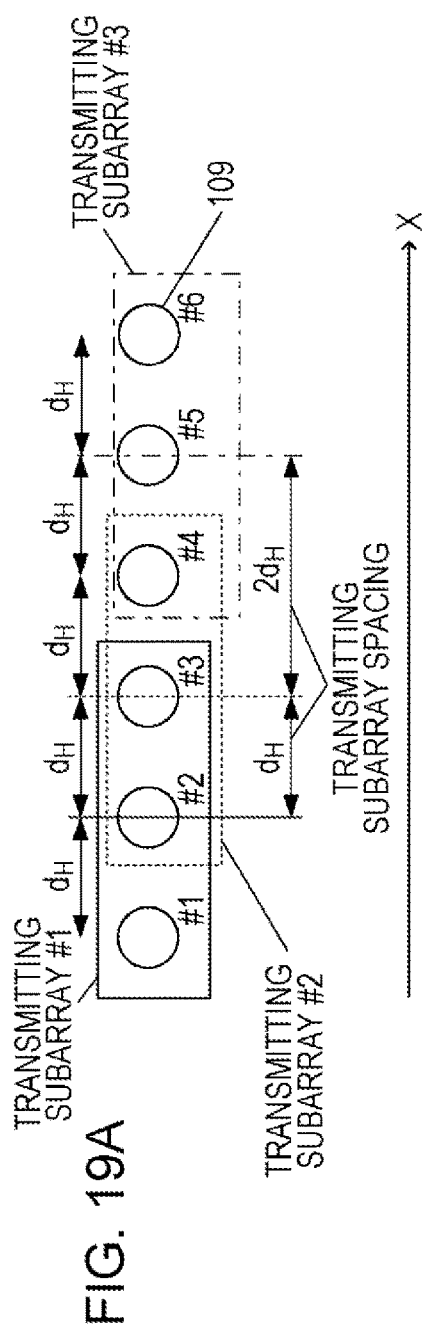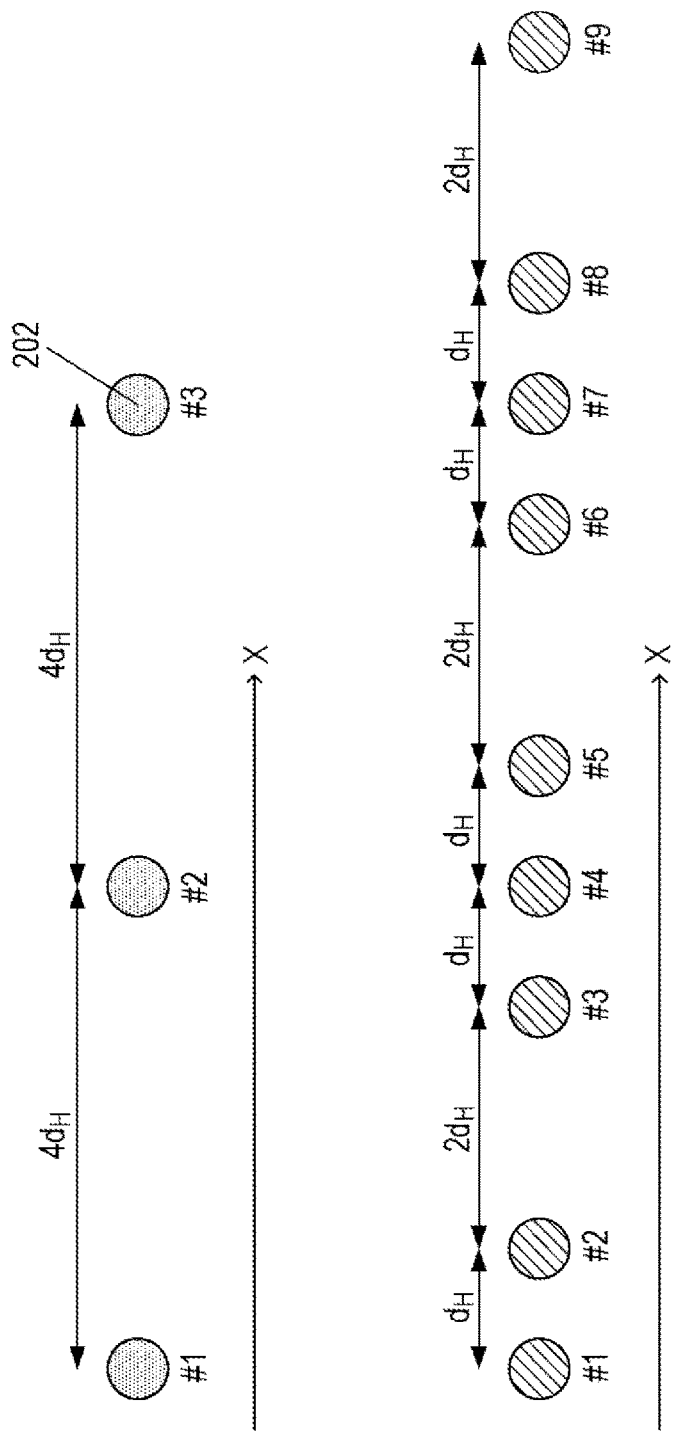

RADAR APPARATUS

BACKGROUND

1. Technical Field

The present disclosure relates to a radar apparatus.

2. Description of the Related Art

In recent years, a radar apparatus has been under consideration which uses short-wavelength radar transmission signals including microwaves or millimeter waves that yield high resolution. Further, for improvement in outdoor safety, there has been a demand for the development of a radar apparatus (wide-angle radar apparatus) that detects objects (targets) including pedestrians, as well as vehicles, in a wide angular range.

As a radar apparatus, a configuration (referred to as "multiple-input and multiple-output (MIMO) radar") has been proposed which includes a plurality of antennas (array antenna) both at a receiving branch and at a transmitting branch and performs beam scanning through signal processing with the transmitting and receiving array antennas (see, for example, Jian Li, Petre Stoica, "MIMO Radar with Colocated Antennas," Signal Processing Magazine, IEEE Vol. 24, Issue: 5, pp. 106-114, 2007).

However, the conventional MIMO radar may suffer from an increase in circuit size.

SUMMARY

One non-limiting and exemplary embodiment facilitates providing a radar apparatus that makes it possible to reduce circuit size in a MIMO radar.

In one general aspect, the techniques disclosed here feature a radar apparatus including: a radar transmitter that transmits a plurality of radar signals while switching among a plurality of transmitting subarrays; and a radar receiver that receives reflected-wave signals produced by the plurality of radar signals being reflected by a target, the plurality of radar signals being transmitted from the respective transmitting subarrays, wherein each of the plurality of transmitting subarrays includes a plurality of transmitting antennas, and adjacent ones of the plurality of transmitting subarrays share at least one of the plurality of transmitting antennas with each other.

An aspect of the present disclosure contributes to reducing circuit size in a MIMO radar.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8A shows an example arrangement of transmitting subarrays according to Example Antenna Arrangement 2;

FIG. 8B shows an example arrangement of receiving antennas according to Example Antenna Arrangement 2;

FIG. 8C shows an example arrangement of a virtual receiving array according to Example Antenna Arrangement 2;

FIG. 9A shows an example arrangement of transmitting subarrays according to Example Antenna Arrangement 3;

FIG. 9B shows an example arrangement of receiving antennas according to Example Antenna Arrangement 3;

FIG. 9C shows an example arrangement of a virtual receiving array according to Example Antenna Arrangement 3;

FIG. 17A shows an example arrangement of transmitting subarrays according to Example Antenna Arrangement 7;

FIG. 17B shows an example arrangement of receiving antennas according to Example Antenna Arrangement 7;

FIG. 17C shows an example arrangement of a virtual receiving array according to Example Antenna Arrangement 7;

FIG. 19A shows an example arrangement of transmitting subarrays according to Example Antenna Arrangement 8;

FIG. 19B shows an example arrangement of receiving antennas according to Example Antenna Arrangement 8;

FIG. 19C shows an example arrangement of a virtual receiving array according to Example Antenna Arrangement 8.

DETAILED DESCRIPTION

Figure 1:
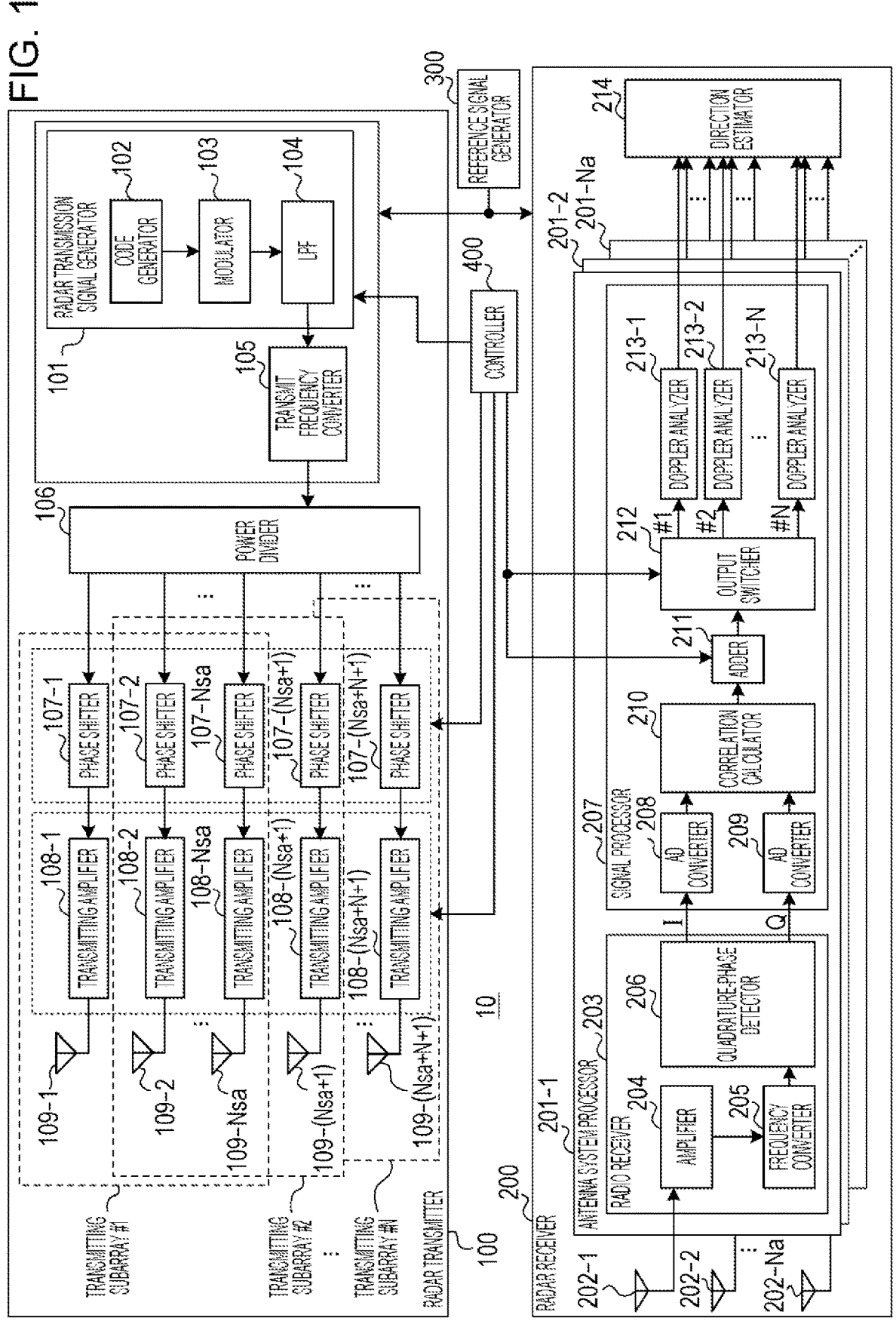
FIG. 1 is a block diagram showing a configuration of a radar apparatus according to Embodiment 1.

For example, as a radar apparatus, a pulse radar apparatus has been known which repeatedly emits pulse waves. A signal that is received by a wide-angle pulse radar that detects at least either a vehicle or a pedestrian in a wide angular range is one obtained by mixing a plurality of reflected waves from a target (e.g. a vehicle) that is present at a short distance and from a target (e.g. a pedestrian) that is present at a long distance. For this reason, (1) a radar transmitter is under consideration which is configured to transmit a pulse wave or a pulse-modulated wave having an autocorrelation characteristic that forms a low-range side lobe (such a characteristic being hereinafter referred to as "low-range side lobe characteristic"), and (2) a radar receiver is under consideration which is configured to have a wide reception dynamic range.

The following two configurations are possible configurations of a wide-angle radar apparatus.

In the first configuration, radar waves are transmitted by mechanically or electronically scanning pulse waves or modulated waves with narrow-angle directional beams (with beams width of approximately several degrees), and reflected waves are received with narrow-angle directional beams. The first configuration requires a large number of scans for high resolution and, as such, is less capable of tracking a fast-moving target.

The second configuration employs a technique (direction of arrival (DOA) estimation) in which reflected waves are received by an array antenna including a plurality of antennas (antenna elements) and the angles of arrival of the reflected waves are estimated by a signal-processing algorithm based on a phase difference in reception due to spacings between antennas.

The second configuration, which allows the angles of arrival to be estimated at a receiving branch even when scanning spacings between transmission beams at a transmitting branch are skipped, achieves a reduction in scanning time and, as such, is higher in tracking capability than the first configuration. Examples of methods for estimating the angle of arrival of a reflected wave include a Fourier transform based on a matrix operation, a Capon method based on an inverse matrix operation, an Linear Prediction (LP) method based on an inverse matrix operation, Multiple Signal Classification (MUSIC) based on an eigenvalue operation, and Estimation of Signal Parameters via Rotational Invariance Techniques (ESPRIT) based on an eigenvalue operation.

Further, the MIMO radar, which performs beam scanning with a plurality of antennas at the transmitting branch as well as at the receiving branch, multiplexes signals by frequency division or code division, transmits the multiplexed signals through the plurality of transmitting antennas, receives, through the plurality of receiving antennas, signals reflected by surrounding objects, demultiplexes the multiplexed transmitted signals from the respective received signals, and receives the demultiplexed signals.

Further, in the MIMO radar, as disclosed, for example, in Jian Li, Petre Stoica, "MIMO Radar with Colocated Antennas," Signal Processing Magazine, IEEE Vol. 24, Issue: 5, pp. 106-114, 2007, at most as many virtual receiving array antennas (hereinafter referred to as "virtual receiving array") as the product of the number of transmitting antennas (or the number of transmitting subarrays) and the number of receiving antenna elements are configured by changing the arrangement of antenna elements in the transmitting and receiving array antennas. This allows the MIMO radar to take out a propagation channel response that is indicated by the product of the number of transmitting antenna elements and the number of receiving antenna elements. Further, the MIMO radar makes it possible to, by placing the transmitting and receiving antennas at predetermined spacings, virtually enlarge the effective aperture length of the array antenna and improve angular resolution.

Further, configurations of antenna elements in the MIMO radar are broadly divided, for example, into a configuration (hereinafter referred to as "single antenna") in which a single antenna element is used and a configuration (hereinafter referred to as "subarray") in which a plurality of antenna elements are used to form subarrays.

In a case where the single antenna is used, the MIMO radar is characterized to have wider directivity but is relatively lower in antenna gain than in a case where the subarray is used. This makes it necessary to perform more addition processes or use more antenna elements in received signal processing in order to improve a received signal-to-noise ratio (SNR) with respect to a radar reflected wave, which may complicate the configuration.

On the other hand, in a case where the subarray is used, the MIMO radar is larger in physical size of the antennas than in a case where the single antenna is used. Specifically, the physical size of the subarray is approximately one wavelength or more of the radio frequency (carrier frequency) of a transmitted signal. Since, from the point of view of physical constraints, it is difficult to arrange the subarrays without lengthening the spacings (interelement spacings) between subarrays by one wavelength or more, a large number of studies have been conducted of the suppression of grating-lobe or side-lobe components in angular directions.

Further, in a case where the subarray is used, the MIMO radar can be higher in antenna gain in the main beam direction than in a case where the single antenna is used. However, the higher the MIMO radar becomes in antenna gain, the narrower the main beam becomes in beam width. For this reason, the MIMO radar performs variable beam control that renders the main beam direction variable in order to widen the angle of a range of detection.

Japanese Unexamined Patent Application Publication No. 2016-90432 discloses, as an array configuration of a MIMO radar with subarrays, a MIMO radar that performs transmission with N transmitting subarrays and performs reception with M receiving subarrays. Further, Japanese Unexamined Patent Application Publication No. 2016-90432 discloses a configuration that renders the main beam direction of a transmitting subarray variable by controlling the weight of a phase shifter of the transmitting subarray. In order to suppress a side lobe that is generated by widening the spacings between subarrays, Japanese Unexamined Patent Application Publication No. 2016-90432 applies optimum weights for the transmitting subarrays and the receiving subarrays.

However, in order for an antenna aperture plane to be divided into the N transmitting subarrays in the MIMO radar disclosed in Japanese Unexamined Patent. Application Publication No. 2016-90432, each of the antenna elements constituting the subarrays needs to be provided with a phase adjustment mechanism (phase shifter) that variably controls the main beam direction of the transmitting subarray. For example, in a case where each of the N transmitting subarrays includes Nsa antenna elements, (Nsa×N) phase shifters are provided, with the result that the MIMO radar increases in circuit size. Further, each of the N transmitting subarrays is also provided with a calibration for an adjustment between phase shifters.

An aspect according to the present disclosure contributes to suppressing a side-lobe or grating-lobe component and reducing the size of circuits (e.g. the number of phase shifters) of the transmitting subarrays in the MIMO radar.

Embodiments according to an aspect of the present disclosure are described below with reference to the drawings. It should be noted that, in the embodiments below, the same constituent elements are given the same reference numerals and a repeated description thereof is omitted.

The following describes a configuration of a MIMO radar in which a transmitting branch of a radar apparatus sends out different time-division multiplexed transmission signals while switching among a plurality of transmitting antennas (transmitting subarrays) in a time-division manner and a receiving branch demultiplexes each of the transmission signals and performs a receiving process. However, without being limited to this configuration, the radar apparatus may alternatively be configured such that the transmitting branch sends out different frequency-division multiplexed transmission signals through the plurality of transmitting antennas and the receiving branch demultiplexes each of the transmission signals and performs a receiving process. Similarly, the radar apparatus may alternatively be configured such that the transmitting branch sends out code-division multiplexed transmission signals through the plurality of transmitting antennas and the receiving branch performs a receiving process.

Embodiment 1

Configuration of Radar Apparatus

FIG. 1 is a block diagram showing a configuration of a radar apparatus 10 according to Embodiment 1.

The radar apparatus 10 includes a radar transmitter (transmitting branch) 100, a radar receiver (receiving branch) 200, a reference signal generator 300, and a controller 400.

The radar transmitter 100 generates radio-frequency radar signals (radar transmission signals) in accordance with reference signals received from the reference signal generator 300. Then, the radar transmitter 100 transmits the radar transmission signals while switching among a plurality of transmitting subarrays #1 to #N in a time-division manner. Note here that N is an integer of not less than 2.

The radar receiver 200 receives, through a receiving array antenna including a plurality of receiving antennas 202-1 to 202-Na, reflected-wave signals produced by the radar transmission signals being reflected by a target (not illustrated).

The radar receiver 200 performs synchronous processing with the radar transmitter 100 by performing the following processing operation with reference to the reference signals received from the reference signal generator 300. That is, the radar receiver 200 processes the reflected-wave signals received through each separate receiving antenna 202 and at least detects the presence or absence of a target or estimates the direction of the target. It should be noted that the target is an object to be detected by the radar apparatus 10 and examples of the target include at least one of vehicles (including four-wheel and two-wheel vehicles) and persons.

The reference signal generator 300 is connected to both the radar transmitter 100 and the radar receiver 200. The reference signal generator 300 supplies the reference signals to the radar transmitter 100 and the radar receiver 200 to synchronize processes in the radar transmitter 100 and the radar receiver 200.

The controller 400 sets, for each radar transmission period (Tr), a pulse code that the radar transmitter 100 generates, a phase that is set in variable beam control by the radar transmitter 100, and a level at which the radar transmitter 100 amplifies a signal. Then, the controller 400 outputs, to a radar transmission signal generator 101, a phase shifter 107, and a transmitting amplifier 108, a control signal (code control signal) indicating the pulse code, a control signal (phase control signal) indicating the phase, and a control signal (transmission control signal) indicating the level at which the transmitted signal is amplified, respectively. Further, the controller 400 outputs, to the radar receiver 200 (i.e. to an adder 211 and an output switches 212), output switching signals indicating the timings of switching (i.e. output switching of radar transmission signals) among the transmitting subarrays #1 to #N in the radar transmitter 100.

Configuration of Radar Transmitter 100

The radar transmitter 100 includes a radar transmission signal generator 101, a transmit frequency converter 105, a power divider 106, phase shifters 107, transmitting amplifiers 108, and transmitting antennas 109.

It should be noted that although the following takes, as an example, a configuration in which a coded pulse radar is used, this does not imply a limitation, and for example, the same can also apply to radar transmission signals with frequency modulation of a frequency modulated continuous wave (FW-CW) radar.

Further, the radar transmitter 100 includes N transmitting subarrays (#1 to #N). Each of the transmitting subarrays includes the same numbers Nsa of phase shifters 107, transmitting amplifiers 108, and transmitting antennas 109. Note here that Nsa is an integer of not less than 2. Further, adjacent transmitting subarrays share (Nsa−1) transmitting antennas 109 (antenna elements), transmitting amplifiers 108, and phase shifters 107 with each other.

Therefore, the numbers of all transmitting antennas 109, transmitting amplifiers 108, and phase shifters 107 that are included in the N transmitting subarrays in the radar transmitter 100 are (Nsa+N+1).

It should be noted that although FIG. 1 shows an example in which each of the transmitting subarrays includes the same number (Nsa) of antenna elements (transmitting antennas 109), each of the transmitting subarrays may include a different number (Nsa) of antenna elements (transmitting antennas 109) (as will be described later).

The radar transmission signal generator 101 receives references signals from the reference signal generator 300, generates timing clocks (clock signals) by multiplying the reference signals by a predetermined number, and generates radar transmission signals in accordance with the timing clocks thus generated. Then, the radar transmission signal generator 101 repeatedly outputs the radar transmission signals with predetermined radar transmission periods (Tr) in accordance with a code control signal for each predetermined radar transmitting period (Tr) from the controller 400. A radar transmission signal is represented by $y(k_r, M) = I(k_r, M) + jQ(k_r, M)$. Note here that j denotes the imaginary unit, k denotes discrete time, and M denotes the ordinal number of a radar transmission period. Further, $I(k_r, M)$ and $Q(k_r, M)$ denote the in-phase component and quadrature component, respectively, of a radar transmission signal $y(k_r, M)$ at discrete time K in the Mth radar transmission period.

The radar transmission signal generator 101 includes a code generator 102, a modulator 103, and an LPF (low-pass filter) 104.

The code generator 102 generates a code $a_n(M)$ (n=1, L) (pulse code) of a code sequence of a code length L in the Mth radar transmission period in accordance with a code control signal for each radar transmission period (Tr). Used as a code $a_n(M)$ that is generated by the code generator 102 is a pulse code that gives a low-range side lobe characteristic. Examples of the code sequence include a Barker code, an M sequence code, and a Gold code. It should be noted that codes $a_n(M)$ that are generated by the code generator 102 may be the same codes or include different codes.

The modulator 103 performs pulse modulation (amplitude modulation, amplitude shift keying (ASK)), pulse shift keying, or phase shift keying (PSK)) on the code $a_n(M)$ outputted from the code generator 102 and outputs a modulated signal to the LPF 104.

The LPF 104 outputs a signal component of the modulated signal outputted from the modulator 103 which is below a predetermined limited bandwidth to the transmission switcher as a baseband radar transmission signal to the transmit frequency converter 105.

The transmit frequency converter 105 frequency-converts the baseband radar transmission signal outputted from the LPF 104 into a radar transmission signal lying within a predetermined carrier-frequency band.

The power divider 106 divides the radar transmission signal lying within the radio-frequency band outputted from the transmit frequency converter 105 into (Nsa+N+1) signals and outputs them to the respective phase shifters 107.

Each of the transmitting subarrays #1 to #N includes Nsa transmitting antennas 109. Each of the transmitting antennas 109 is connected to an individual transmitting amplifier 108 and emits a signal from the transmitting amplifier 108 into a space by unit of transmitting subarray.

In accordance with the code control signals for each radar transmission period (Tr) as indicated by the controller 400, the phase shifters 107 adjust, the phases of the radar transmission signals outputted from the power divider 106.

In accordance with the transmission control signals for each radar transmission period (Tr) as indicated by the controller 400, the transmitting amplifiers 108 either amplify the radar transmission signals outputted from the phase shifters 107 to predetermined levels and output them or turn off the transmission power.

Figure 2:
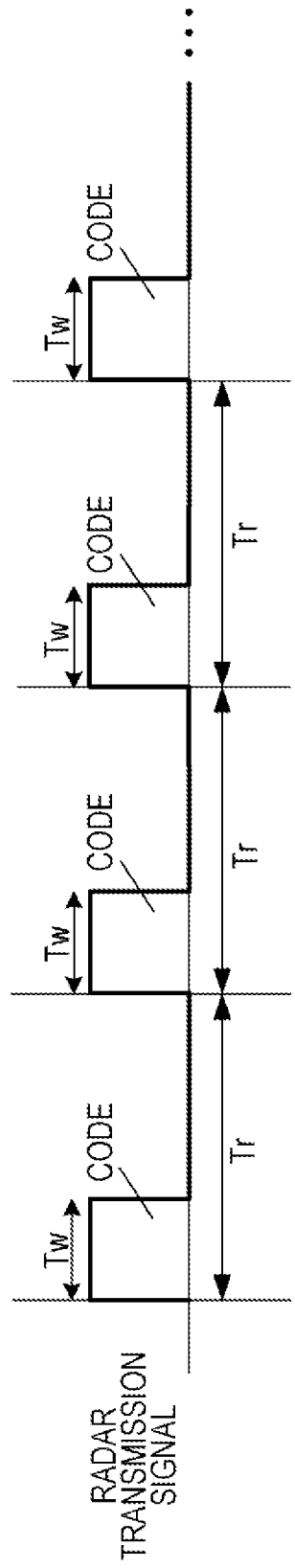
FIG. 2 shows examples of radar transmission signals according to Embodiment 1.

FIG. 2 shows radar transmission signals that are generated by the radar transmitter 100. A pulse code sequence is transmitted during a code transmission section Tw of each radar transmission period Tr, and the remaining section (Tr−Tw) is a no-signal section. The code transmission section Tw includes a pulse code sequence of a code length L. One code includes L subpulses. Further, one subpulse is subjected to pulse modulation with No samples. In the result, each code transmission section Tw includes Nr (=No×L) samples. Further, the no-signal section (Tr−Tw) of a radar transmission period Tr includes Nu samples.

The following describes an output switching operation that the controller 400 performs to switch the output of radar transmission signals from the transmitting subarrays #1 to #N.

Figure 3:
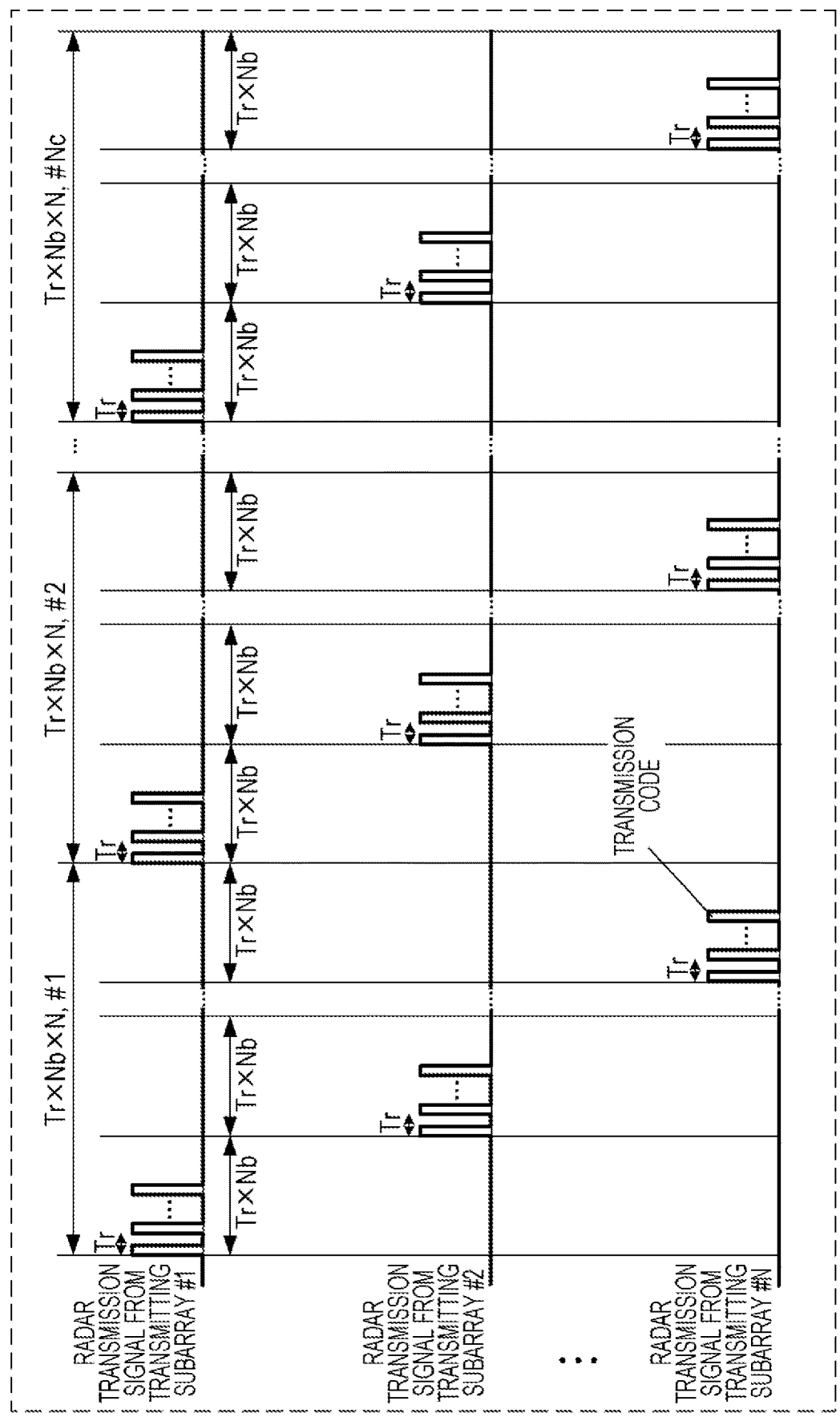
FIG. 3 shows an example of switching control of transmitting subarrays according to Embodiment 1.

FIG. 3 shows an example of a time-division switching operation that the controller 400 performs to switch among the transmitting subarrays #1 to #N in a time-division manner. The controller 400 outputs control signals (i.e. a code control signal, a phase control signal, and a transmission control signal) giving instructions to switch the output from one transmitting subarray to another to the radar transmitter 100 in sequence from the transmitting subarray #1 to the transmitting subarray #N for each radar transmission period Tr. Further, in FIG. 3, the controller 400 performs such control that, with the transmission output period of each of the transmitting subarrays being (Tr×Nb), the operation of switching among the transmission output periods (Tr×Np)=(Tr×Nb×N) of all transmitting subarrays is repeated Nc times. Further, the after-mentioned radar receiver 200 performs a positioning process on the basis of the switching operation of the controller 400.

For example, the controller 400 may render the direction of a beam that is transmitted from a transmitting subarray variable for each positioning process. This allows the radar apparatus 10 to perform positioning in a wide angular range.

For example, in a case of transmitting a radar transmission signal from the transmitting subarray #1, the controller 400 outputs, to the phase shifters 107-1 to 107-Nsa included in the transmitting subarray #1, phase control signals containing phase information giving instructions to orient the main beam in a predetermined direction and does not update phase information for the phase shifters 107 that are not included in the transmitting subarray #1. Further, the controller 400 outputs, to the transmitting amplifiers 108-1 to 108-Nsa included in the transmitting subarray #1, transmission control signals giving instructions to amplify input signals to predetermined levels and outputs, to the transmitting amplifiers 108 that are not included in the transmitting subarray #1, transmission control signals giving instructions to turn off the transmission power.

Similarly, as in the case of the transmitting subarray #1, in a case of transmitting a radar transmission signal from the transmitting subarray #2, the controller 400 outputs, to the phase shifters 107-2 to 107-(Nsa+1) included in the transmitting subarray #2, phase control signals containing phase information giving instructions to orient the main beam in a predetermined direction and does not update phase information for the phase shifters 107 that are not included in the transmitting subarray #2. Further, the controller 400 outputs, to the transmitting amplifiers 108-2 to 108-(Nsa+1) included in the transmitting subarray #2, transmission control signals giving instructions to amplify input signals to predetermined levels and outputs, to the transmitting amplifiers 108 that are not included in the transmitting subarray #2, transmission control signals giving instructions to turn off the transmission power.

From that point forward, the controller 400 performs the same control on the transmitting subarrays #3 to #N in sequence.

The foregoing has described the output switching operation that the controller 400 performs to switch the output of radar transmission signals.

Figure 4:
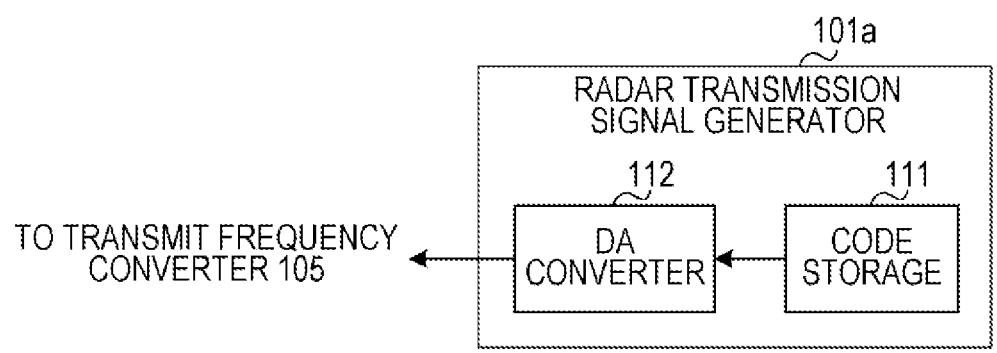
FIG. 4 is a block diagram showing another configuration of a radar transmission signal generator according to Embodiment 1.

It should be noted that the radar transmitter 100 may include a radar transmission signal generator 101a, which is shown in FIG. 4, instead of including the radar transmission signal generator 101. The radar transmission signal generator 101a includes a code storage 111 and a DA converter 112 instead of including the code generator 102, the modulator 103, or the LPF 104, which are shown in FIG. 1. The code storage 111 stores in advance code sequences generated by the code generator 102 (FIG. 1) and cyclically and sequentially reads out the code sequences thus stored. The DA converter 112 coverts, into an analog baseband signal, a code sequence (digital signal) outputted from the code storage 111.

Configuration of Radar Receiver 200

As shown in FIG. 1, the radar receiver 200 includes antenna system processors 201-1 to 201-Na, receiving antennas 202-1 to 202-Na, and a direction estimator 214. The receiving antennas 202-1 to 202-Na are for example array antennas (receiving array antennas).

Each of the receiving antennas 202 receives a reflected-wave signal produced by a radar transmission signal being reflected by a reflecting object including a measurement target (object) and outputs the reflected-wave signal thus received to the corresponding one of the antenna system processors 201 as a received signal.

Each of the antenna system processors 201-1 to 201-Na includes a radio receiver 203 and a signal processor 207. It should be noted that the radio receiver 203 and the signal processor 207 receive reference signals from the reference signal generator 300, generate timing clocks (reference clock signals) by multiplying the reference signals by a predetermined number, and operate in accordance with the timing clocks thus generated, thereby ensuring synchronization with the radar transmitter 100.

Each of the radio receivers 203 includes an amplifier 204, a frequency converter 205, and a quadrature-phase detector 206. In the zth radio receiver 203, the amplifier 204 amplifies a received signal received from the zth receiving antenna 202 to a predetermined level, the frequency converter 205 converts the frequency of the received signal from a high-frequency band into a baseband, and the quadrature-phase detector 206 converts the baseband received signal into a baseband received signal including an I signal and a Q signal. Note here that z=1, . . . , Na.

Each of the signal processors 207 includes AD converters 208 and 209, a correlation calculator 210, an adder 211, an output switcher 212, and Doppler analyzers 213-1 to 213-N.

In the zth signal processor 207, the AD converter 208 receives the baseband signal including the I signal from the quadrature-phase detector 206, and the AD converter 209 receives the baseband signal including the Q signal from the quadrature-phase detector 206. The AD converter 208 takes discrete-time samples of the baseband signal including the I signal and thereby converts the I signal into digital data. The AD converter 209 takes discrete-time samples of the baseband signal including the Q signal and thereby converts the Q signal into digital data.

Note here that each of the AD converts 208 and 209 takes $N_s$ discrete samples for the duration Tp (=Tw/L) of each subpulse of a radar transmission signal. That is, the over-sampling number per subpulse is Ns.

In the following description, with use of an I signal $I_z(k, M)$ and a Q signal $Q_z(k, M)$, a baseband received signal that is outputted from the AD converters 208 and 209 at discrete time k in the Mth radar transmission period Tr[M] is expressed as a complex signal $x_z(k, M)=I_z(k, M)+jQ_z(k, M)$. Further, in the following, discrete time k has its basis (k=1) at the timing of the start of a radar transmission period (Tr), and the signal processor 207 periodically performs measurements until a sample point k=(Nr+Nu)Ns/No preceding the end of the radar transmission period Tr. That is, k=1, (Nr+Nu)Ns/No. Note here that j is the imaginary unit.

In the zth signal processor 207, for each radar transmission period Tr, the correlation calculator 210 performs a correlation calculation between a discrete sample value $x_z(k, M)$ including the discrete sample value $x_z(k, M)$ received from the AD converters 208 and 209 and the pulse code $a(M)_n$ (where z=1, . . . , Na and n=1, . . . , L) transmitted by the radar transmitter 100. For example, the correlation calculator 210 performs a sliding correlation calculation between the discrete sample value $x_z(k, M)$ and the pulse code $a_n(M)$. For example, the correlation calculation value $AC_z(k, M)$ of a sliding correlation calculation at discrete time k in the Mth radar transmission period Tr[M] is calculated according to Eq. (1):

$$AC_z(k, M) = \sum_{n=1}^{L} x_z(k + N_s(n-1), M)a_n(M)^* \qquad (1)$$

where the asterisk (*) denotes a complex conjugate operator.

The correlation calculator 210 performs correlation calculations according to Eq. (1), for example, over the duration of k=1, . . . , (Nr+Nu)Ns/No.

Figure 5:
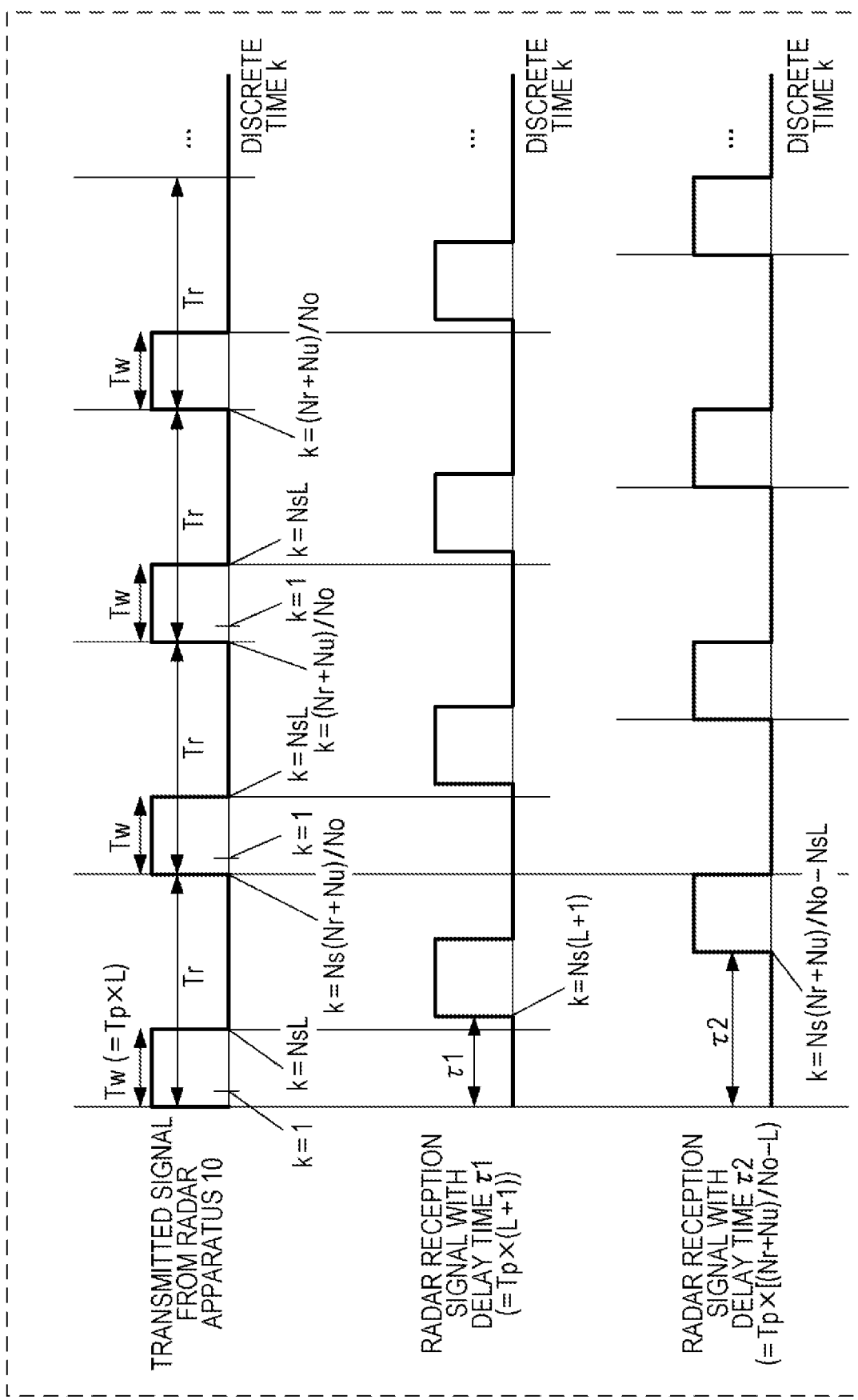
FIG. 5 shows examples of timings of transmission of radar transmission signals and examples of measuring ranges according to Embodiment 1.

It should be noted that the correlation calculator 210 is not limited to the case of performing correlation calculations over the duration of k=1, . . . , (Nr+Nu)Ns/No, but may limit a measuring range (i.e. the range of k) according to the range of presence of a target to be measured by the radar apparatus 10. This enables the radar apparatus 10 to reduce the amount of arithmetic processing that is performed by the correlation calculator 210. For example, the correlation calculator 210 may limit the measuring range to k=Ns(L+1), . . . , (Nr+Nu)Ns/No−NsL. In this case, as shown in FIG. 5, the radar apparatus 10 does not perform measurements in time sections corresponding to code transmission sections Tw. It should be noted that, in FIG. 5, τ1 and τ2 represent delay times. τ1 is Tp×(L+1), and τ2 is Tp×[(Nr+Nu)/No−L].

With this, even in such a case where a radar signal transmitted from the radar transmitter 100 sneaks directly to the radar receiver 200 (a leak signal is received), the radar apparatus 10 does not perform processing through the correlation calculator 210, as a period in which the radar transmission signal transmitted from the radar transmitter 100 arrives at the radar receiver 200 (i.e. a period of at least less than τ1) is a time section corresponding to a code transmission section Tw. This makes it less likely for the radar apparatus 10 to perform measurements including directly sneaking signals in measurement targets. Further, in a case where the measuring range (range of k) is limited, the radar apparatus 10 may apply processing in a similarly limited measuring range (range of k) to processes in the adders 211, the output switcher 212, the Doppler analyzers 213, and the direction estimator 214, which will be described below. This makes it possible to reduce the amount of processing in each component, allowing the radar receiver 200 to consume less electricity.

In the zth signal processor 207, the adder 211, based on an output switching signal outputted from the controller 400, performs addition (coherent integration) with a correlation calculation value $AC_z(k, M)$ received from the correlation calculator 210 for each discrete time k, using as a unit the duration (Tr×Nb) of Nb radar transmission periods Tr of continuous transmission from the $N_D$th transmitting subarray (#$N_D$). Note here that $N_D=1, \ldots, N$ and $z=1, \ldots, Na$.

The addition (coherent integration) process over the duration (Tr×Nb) is expressed by Eq. (2):

$$CI_z^{(ND)}(k, m) = \sum_{g=1}^{N_b} AC_z(k, (N \times N_b)(m-1) + (N_D - 1) \times N_b + g) \quad (2)$$

Note here that $CI_z^{(ND)}(k, m)$ denotes the value of addition (hereinafter referred to as "correlation additional value") of correlation calculation values and m is an integer of not less than 1 that indicates the ordinal number of the number of times the adder 211 performs addition. Further, $z=1, \ldots, Na$.

It should be noted that, in order for an ideal gain of addition to be achieved, it is conceivable, for example, that the phase components of correlation calculation values fall within a predetermined range in sections of addition of correlation calculation values. The number of additions is set according to an assumed maximum moving velocity of a target to be measured. A reason for this is that an increase in the assumed maximum velocity of the target leads to an increase in amount of variation in the Doppler frequencies of reflected waves from the target. For this reason, there is a reduction in duration of time for which the correlation is high. Therefore, Np (=N×Nb) takes on a smaller value, with the result that the addition performed by the adders 211 brings about a smaller gain improvement effect.

For this reason, in the zth signal processor 207, the output switcher 212, based on an output switching signal outputted from the controller 400, outputs addition results $CI_z^{(ND)}(k, m)$ for each discrete time k to the $N_D$th Doppler analyzers 213-$N_D$ by selective switching, the addition results $CI_z^{(ND)}(k, m)$ for each discrete time k being added by using as a unit the duration (Tr×Nb) of Nb radar transmission periods Tr of continuous transmission from the $N_D$th transmitting subarray. Note here that $N_D=1, \ldots, N$ and $z=1, \ldots, Na$.

Each of the signal processors 207 includes as many as (N) Doppler analyzers 213-1 to 213-N as the transmitting subarrays.

Each of the Doppler analyzers 213 performs coherent integration at uniform timings of discrete time k with $CI_z^{(ND)}(k, Nc(w-1)+1)$ to $CI_z^{(ND)}(k, Nc \times w)$, which are Nc outputs from the adder 211 obtained for each discrete time k, as a unit. For example, the Doppler analyzer 213 performs coherent integration after correcting a phase variation $\Phi(fs)=2\pi fs(Tr \times Nb)\Delta\Phi$ depending on 2Nf different Doppler frequencies $fs\Delta\Phi$ according to Eq. (3):

$$\begin{aligned}FT\_CI_z^{(ND)}(k, f_s, w) = \qquad\qquad\qquad\qquad (3)\\
\sum_{q=0}^{N_c-1} CI_z^{(ND)}(k, N_c(w-1)+q+1)\exp[-j\phi(f_s)q] = \\
\sum_{q=0}^{N_c-1} CI_z^{(ND)}(k, N_c(w-1)+q+1)\exp[-j2\pi f_s T_r N_b q\Delta\phi]\end{aligned}$$

Note here that $FT\_CI_z^{(ND)}(k, fs, w)$ is the wth output from the $N_D$th Doppler analyzer 213-$N_D$ of the zth signal processor 207 and represents a result of coherent integration of Doppler frequencies $fs\Delta\Phi$ at discrete time k with respect to the $N_D$th output from the adder 211. Note, however, that $N_D=1$ to Na, $fs=-Nf+1, \ldots, 0, \ldots, Nf$, $k=1, \ldots, (Nr+Nu)Ns/No$, w is a natural number, and $\Delta\Phi$ is the phase rotation unit.

This allows each of the signal processors 207 to yield $FT\_CI_z^{(ND)}(k, -Nf+1, w), \ldots, FT\_CI_z^{(ND)}(k, Nf-1, w)$, which are results of coherent integration according to 2Nf Doppler frequency components for each discrete time k, for the duration (Tr×Nb×Nc) of every Nb×Nc radar transmission periods Tr. It should be noted that j is the imaginary unit and $z=1, \ldots, Na$.

In a case where $\Delta\Phi=1/Nc$, the aforementioned process in the Doppler analyzer 213 is equivalent to performing a discrete Fourier transform (DFT) process on outputs from the adder 211 at a sampling frequency fm=1/Tm at sampling spacings Tm=(Tr×Np).

Further, setting Nf to a power-of-two number allows the Doppler analyzer 213 to apply a fast Fourier transform (FFT) process and reduce the amount of arithmetic processing. It should be noted that when Nf>Nc, performing zero filling such that $CI_z^{(ND)}(k, Nc(w-1)+q)=0$ in a region where q>Nc makes it possible to similarly apply an FFT process and reduce the amount of arithmetic processing.

Alternatively, instead of performing an FFT process, the Doppler anaylzer 213 may perform a process of serially performing product-sum operations according to Eq. (3) above. For example, in response to $CI_z^{(ND)}(k, Nc(w-1)+q+1)$, which are Nc outputs from the adder 211 obtained for each discrete time k, the Doppler analyzer 213 may generate a coefficient $\exp[-j2\pi f_s T_r N_b q\Delta\varphi]$ corresponding to $fs=-Nf+1, \ldots, 0, \ldots, Nf-1$ and serially perform product-sum operations. Note here that q=0 to Nc−1.

It should be noted that, in the following description, the wth outputs $FT\_CI_z^{(1)}(k, fs, w), FT\_CI_z^{(Na)}(k, fs, w)$ obtained by performing the same processes in the first to Nath signal processors 207 are denoted as a virtual receiving array correlation vector h(k, fs, w) in Eq. (4) and Eq. (5). The virtual receiving array correlation vector h(k, fs, w) includes as many elements as N×Na, which is the product of the number N of transmitting subarrays and the number Na of receiving antennas 202. The virtual receiving array correlation vector h(k, fs, w) is used in the following description of a process of forming a direction estimation based on a phase difference between receiving antennas 202 in response to reflected-wave signals from a target. Note here that $z=1, \ldots, Na$ and $N_D=1, \ldots, N$. Further, the following equations further include a process of correcting a phase rotation for each Doppler frequency (fsΔφ) attributed to a time difference between transmissions from each of the transmitting subarrays. That is, with the first transmitting subarray ($N_D=1$) as a reference, a received signal FT_CI$_z^{(Na)}$(k, fs, w) of a Doppler component (fsΔφ) component from the $N_D$th transmitting subarray is multiplied by exp[−2π$f_s$Δφ($N_D$−1)$T_rN_b$].

$$h(k, fs, w) = \begin{bmatrix} FT\_CI_1^{(1)}(k, fs, w) \\ FT\_CI_1^{(2)}(k, fs, w)\exp(-j2\pi fs\Delta\phi T_rN_b) \\ \vdots \\ FT\_CI_1^{(N)}(k, fs, w)\exp(-j2\pi fs\Delta\phi(N-1)T_rN_b) \\ FT\_CI_2^{(1)}(k, fs, w) \\ FT\_CI_2^{(1)}(k, fs, w)\exp(-j2\pi fs\Delta\phi T_rN_b) \\ \vdots \\ FT\_CI_2^{(N)}(k, fs, w)\exp(-j2\pi fs\Delta\phi(N-1)T_rN_b) \\ \vdots \\ FT\_CI_{Na}^{(1)}(k, fs, w) \\ FT\_CI_{Na}^{(1)}(k, fs, w)\exp(-j2\pi fs\Delta\phi T_rN_b) \\ \vdots \\ FT\_CI_{Na}^{(N)}(k, fs, w)\exp(-j2\pi fs\Delta\phi(N-1)T_rN_b) \end{bmatrix} \quad (4)$$

$$= \begin{bmatrix} h_1(k, fs, w) \\ h_2(k, fs, w) \\ \vdots \\ h_{Na}(k, fs, w) \end{bmatrix}$$

$$h(k, fs, w) = \begin{bmatrix} FT\_CI_z^{(1)}(k, fs, w) \\ FT\_CI_z^{(2)}(k, fs, w)\exp(-j2\pi fs\Delta\phi T_rN_b) \\ \vdots \\ FT\_CI_z^{(N)}(k, fs, w)\exp(-j2\pi fs\Delta\phi(N-1)T_rN_b) \end{bmatrix} \quad (5)$$

The foregoing has described processes in the components of the signal processor 207.

The direction estimator 214 multiplies virtual receiving array correlation vectors h(k, fs, w) of the wth Doppler analyzers 213 outputted from the first to Nath signal processors 207 by an array correction value h_cal$_{[b]}$ that corrects phase deviations and amplitude deviations between transmitting subarrays and between receiving array antennas, thereby calculating a virtual receiving array correlation vector h$_{\_after\_cal}$(k, fs, w) with corrections made to the deviations between antennas. The virtual receiving array correlation vector h$_{\_after\_cal}$(k, fs, w) is expressed by Eq. (6). It should be noted that b=1, . . . , (N×Na).

$$h_{\_after\_cal}(k, fs, w) = CAh(k, fs, w) = \begin{bmatrix} h_1(k, fs, w) \\ h_2(k, fs, w) \\ \vdots \\ h_{Na \times Nr}(k, fs, w) \end{bmatrix} \quad (6)$$

$$CA = \begin{bmatrix} h\_cal_{[1]} & 0 & \cdots & 0 \\ 0 & h\_cal_{[2]} & \ddots & \vdots \\ \vdots & \ddots & \ddots & 0 \\ 0 & \cdots & 0 & h\_cal_{[Nt \times Na]} \end{bmatrix}$$

The virtual receiving array correlation vector h$_{\_after\_cal}$(k, fs, w) with corrections made to the inter-antenna deviations is a column vector including Na×Nr elements. In the following, the elements of the virtual receiving array correlation vector h$_{\_after\_cal}$(k, fs, w) are denoted as h$_1$(k, fs, w), h$_{Na \times Nr}$(k, fs, w) for use in a description of a direction estimation process.

Then, the direction estimator 214 performs a direction estimation process with the virtual receiving array correlation vector h$_{\_after\_cal}$(k, fs, w) on the basis of the phase difference in reflected-wave signal between the receiving antennas 202.

The direction estimator 214 calculates a spatial profile with variations in azimuth direction θ in a direction estimation evaluation function value P$_H$(θ, k, fs, w) within a predetermined angular range, extracts a predetermined number of maximal peaks of the calculated spatial profile in descending order, and sets the azimuth directions of the maximal peaks as a direction-of-arrival estimated value.

It should be noted that the evaluation function value P$_H$(θ, k, fs, w) can be obtained by various methods depending on direction-of-arrival estimation algorithms. For example, a usable example of a method for estimation with an array antenna is disclosed in Direction-of-arrival estimation using signal subspace modeling Cadzow, J. A.; Aerospace and Electronic Systems, IEEE Transactions on Volume: 28, Issue: 1 Publication Year: 1992, Page(s): 64-79.

For example, a beamformer method can be expressed by Eq. (7) and Eq. (8). Other techniques such as Capon and MUSIC are similarly applicable.

$$P_H(\theta_u, k, fs, w) = |a_H(\theta_u)^H h_{\_after\_cal}(k, fs, w)|^2 \quad (7)$$

$$a_H(\theta_u) = \begin{bmatrix} 1 \\ \exp\{-j2\pi d_H \sin\theta_u / \lambda\} \\ \vdots \\ \exp\{-j2\pi(N_{VAH} - 1)d_H \sin\theta_u / \lambda\} \end{bmatrix} \quad (8)$$

Note here that the superscript H is the Hermitian transposed operator. Further, $a_H(\theta_u)$ denotes the directional vector of a virtual receiving array with respect to an incoming wave in the azimuth direction $\theta_u$. Further, the azimuth direction $\theta_u$ is a vector obtained by changing, by a predetermined azimuth spacing $\beta_1$, an azimuth range within which a direction-of-arrival estimation is formed. For example, $\theta_u$ is set as follows:

$$\theta_u = \theta min + u\beta_1, u = 0, \ldots, NU$$

$$NU = \text{floor}[(\theta max - \theta min)/\beta_1] + 1$$

where floor (x) is a function that returns a maximum integer value that does not exceed the real number x.

It should be noted that the aforementioned time information k may be converted into distance information to be outputted. The time information k may be converted into distance information R(k) according to Eq. (9). Note here that Tw denotes the code transmission section, L denotes the pulse code length, and $C_0$ denotes the velocity of light.

$$R(k) = k\frac{T_w C_0}{2L} \quad (9)$$

Further, the Doppler frequency information may be converted into a relative velocity component to be outputted. The Doppler frequency fsΔΦ can be converted into a relative velocity component vd(fs) according to Eq. (10). Note here that λ is the wavelength of the carrier frequency of an RF signal that is outputted from the transmit frequency converter 105.

$$v_d(f_s) = \frac{\lambda}{2} f_s \Delta \theta \qquad (10)$$

Antenna Arrangement in Radar Apparatus 10

Arrangements of the N transmitting subarrays (transmitting antennas 109) and the Na receiving antennas 202 in the radar apparatus 10 thus configured are described.

Example Antenna Arrangement 1

Figure 6A:
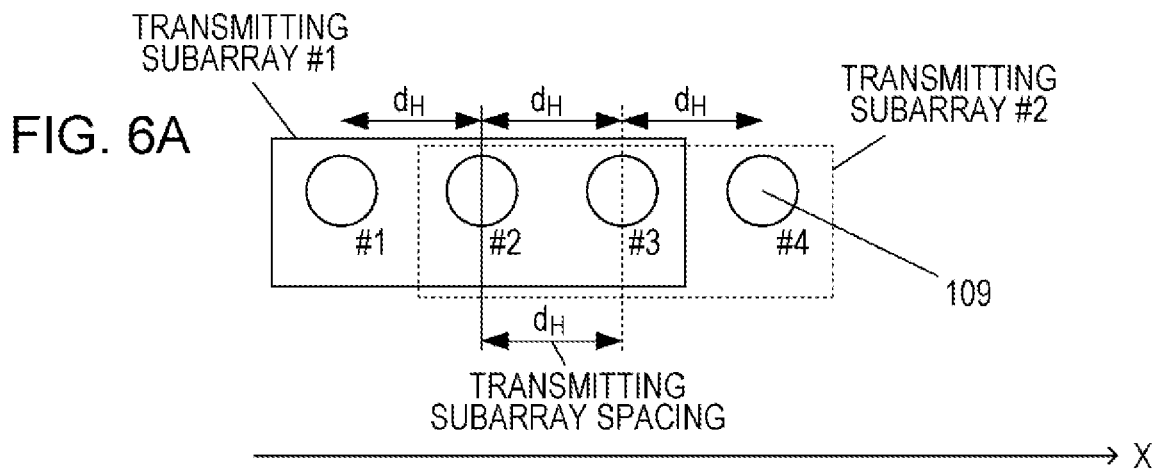
FIG. 6A shows an example arrangement of transmitting subarrays according to Example Antenna Arrangement 1.
Figure 6B:
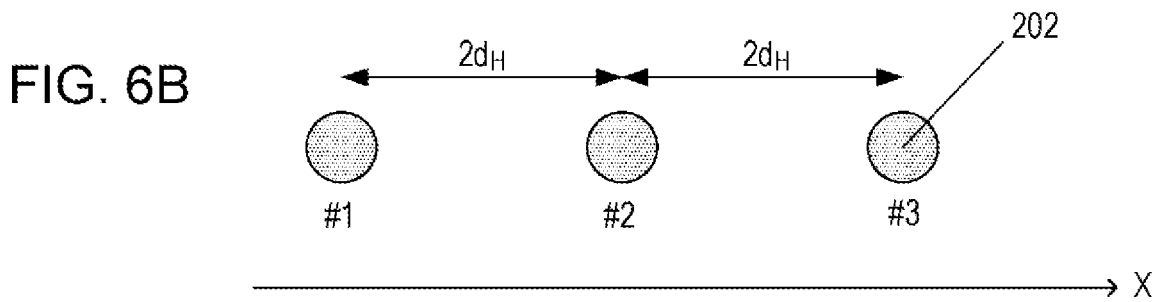
FIG. 6B shows an example arrangement of receiving antennas according to Example Antenna Arrangement 1.
Figure 6C:
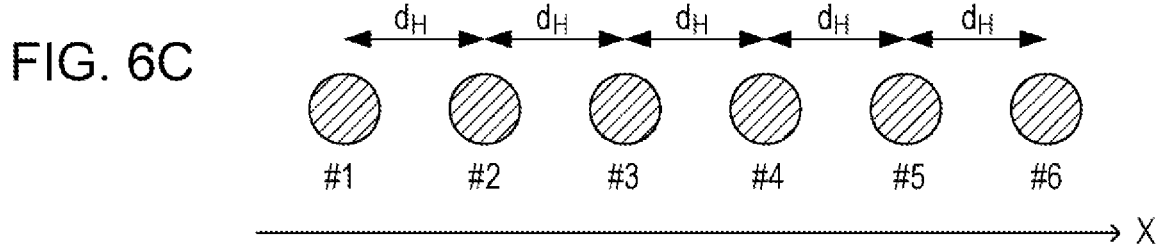
FIG. 6C shows an example arrangement of a virtual receiving array according to Example Antenna Arrangement 1.

FIGS. 6A to 6C show examples of an arrangement of transmitting subarrays, an arrangement of receiving antennas 202, and an arrangement of a virtual receiving array, respectively, in Example Antenna Arrangement 1. In each of FIGS. 6A to 6C, an X axis is defined. It should be noted that, in the following description, the direction of an arrow shown in each of FIGS. 6A to 6C is the positive direction of the X axis. Further, as for an X axis shown in each of FIG. 8A and its subsequent drawings, too, the direction of an arrow is the positive direction of the X axis.

Example Antenna Arrangement 1 shows an antenna arrangement in which the number N of transmitting subarrays is 2 and the number Nsa of transmitting antennas 109 that each of the transmitting subarrays includes is 3.

In FIG. 6A, four transmitting antennas #1 to #4 are placed at regular spacings of a predetermined value $d_H$ in a predetermined direction (e.g. a horizontal direction). Further, in FIG. 6A, each of the transmitting subarrays #1 and #2 includes the same number (3 (=Nsa)) of transmitting antennas 109. Specifically, the transmitting subarray #1 includes the transmitting antennas #1 to #3, and the transmitting subarray #2 includes the transmitting antennas #2 to #4. That is, the adjacent transmitting subarrays share (Nsa−1)=2 transmitting antennas 109 (in FIG. 6A, the transmitting antennas #2 to #3) with each other.

Further, in FIG. 6A, the configuration spacing between the transmitting subarrays #1 and #2 (hereinafter referred to as "transmitting subarray spacing") is $d_H$.

Further, in FIG. 6B, the number of receiving antennas 202 is 3 (=Na). The interelement spacings (configuration spacings) between receiving antennas 202 take on a value that is equal to or greater than a value ($d_H \times N$) obtained by multiplying the transmitting subarray spacing $d_H$ by the number N of transmitting subarrays. In FIG. 6B, N=2, and the interelement spacings between receiving antennas 202 are $2d_H$.

Further, the virtual receiving array shown in FIG. 6C includes, for example, the number of antenna elements that is determined by the product of the number of transmitting subarrays of FIG. 6A and the number of receiving antenna elements of FIG. 6B. The virtual receiving array includes, for example, 6 (=N×Na=(2×3)) antenna elements. The antenna element numbers of the virtual receiving array shown in FIG. 6C (i.e. #1, #2, #3, #4, #5, and #6, which are arranged in this order from the negative direction of the X axis toward the positive direction of the X axis) indicate numbers corresponding to the order of elements of the virtual receiving array correlation vector h(k, fs, w) shown in Eq. (4). The direction estimator 214 performs a direction estimation process with the virtual receiving array correlation vector h(k, fs, w), which represents signals received by the virtual receiving array shown in FIG. 6C.

Since the virtual receiving array shown in FIG. 6C includes 6 (=N×Na) antenna elements and has its transmitting subarrays placed at spacings $d_H$ as shown in FIG. 6A, the antenna elements of the virtual receiving array are placed at regular transmitting subarray spacings $d_H$.

With this, for example, in a case where $d_H$=0.5λ with respect to the wavelength of a carrier frequency, the radar apparatus 10 becomes able to, by using the virtual receiving array shown in FIG. 6D, form a direction-of-arrival estimation with suppressed grating-lobe components and side-lobe components over a wide range of ±90 degrees, thus bringing about an effect of reducing estimation errors in radar positioning.

It should be noted that in a case where $d_H$=0.5λ, each of the transmitting subarrays has a size of not smaller than $2d_H$ (i.e. one wavelength). Note, however, that by placing adjacent transmitting subarrays so that the adjacent transmitting subarrays share transmitting antennas 109 with each other as shown in FIG. 6A, the transmitting subarray spacing ($d_H$) can be made narrower than the size ($2d_H$) of each of the transmitting subarrays. Further, by placing adjacent transmitting subarrays so that the adjacent transmitting subarrays share transmitting antennas 109 with each other, the number of transmitting antennas 109 and the numbers of phase shifters 107 and transmitting amplifiers 108 that correspond to the transmitting antennas 109 can be reduced.

Note here that the effect of reducing the number of phase shifters 107 (transmitting amplifiers 108) in a case where the number of transmitting subarrays is N, each of the transmitting subarrays includes the same number Nsa of transmitting antennas 109, and the number of transmitting antennas 109 that adjacent transmitting subarrays share with each other is (Nsa−1) can be expressed by Eq. (11). It should be noted that Eq. (11) makes a comparison with a conventional example in which adjacent transmitting subarrays share no transmitting antennas 109 with each other.

$$\text{Effect of reducing the number of phase shifters (transmitting amplifiers)} \text{ (as compared with the conventional example)} = \frac{Nsa + (N-1)}{Nsa \times N} \qquad (11)$$

For example, in a case where, as shown in FIG. 6A, the number N of transmitting subarrays is 2, each of the transmitting subarrays includes the same number (3 (=Nsa)) of transmitting antennas 109, and the number of transmitting antennas 109 that adjacent transmitting subarrays share with each other is 2 (=Nsa−1), the number of transmitting antennas 109 is Nsa+(N−1)=3+(2−1)=4. Therefore, the numbers of phase shifters 107 (and transmitting amplifiers 108) that correspond to the transmitting antennas 109 that the radar apparatus 10 includes in this case are each 4.

Meanwhile, in a case where the number N of transmitting subarrays is 2, each of the transmitting subarrays includes the same number (3 (=Nsa)) of transmitting antennas 109, and adjacent transmitting subarrays share no transmitting antennas with each other, the number of transmitting antennas is Nsa×N=3×2=6. Therefore, the numbers of phase shifters (and transmitting amplifiers) that correspond to the transmitting antennas (antenna elements) that the radar apparatus includes in this case are each 6.

This shows that Example Antenna Arrangement 1 brings about an effect of reducing the numbers of phase shifters 107 and transmitting amplifiers 108 to ⅔ as compared with the conventional example.

Figure 7:
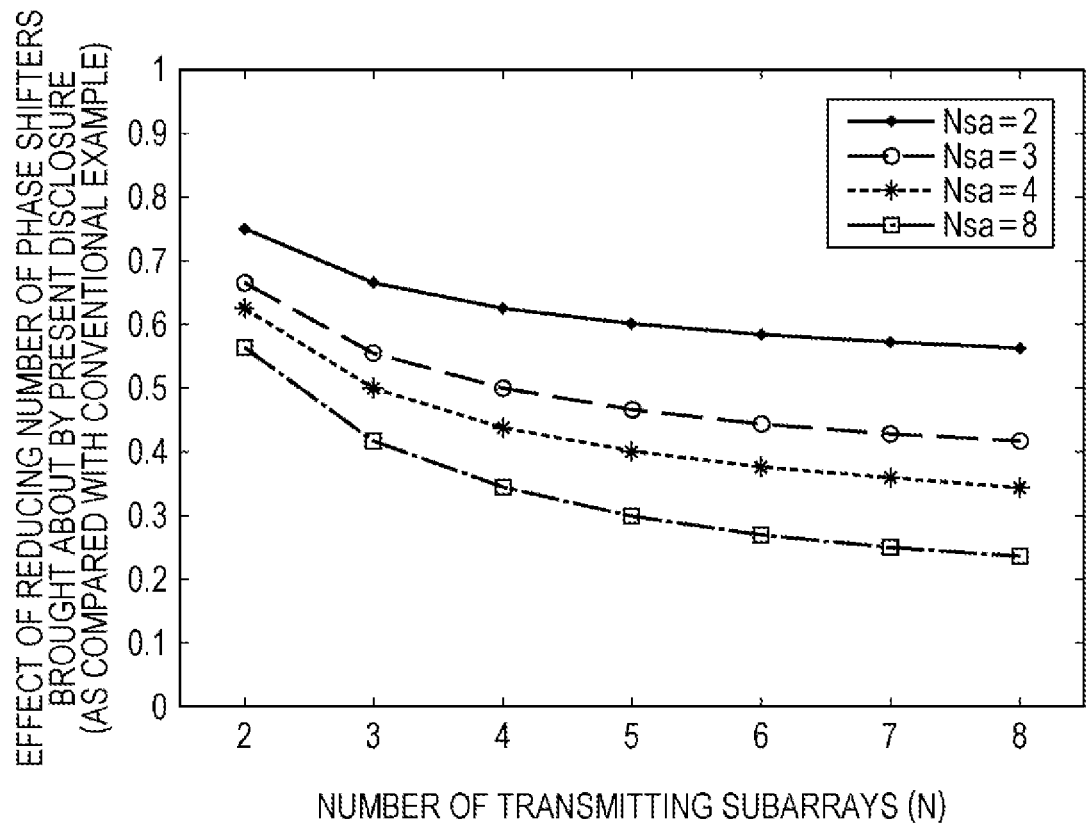
FIG. 7 shows an example of an effect of reducing the number of phase shifters according to Example Antenna Arrangement 1.

In FIG. 7, the horizontal axis represents the number of transmitting subarrays (N), and the vertical axis represents the effect of reducing the number of phase shifters brought about by the present disclosure (as compared with the conventional example). Specifically, FIG. 7 shows an effect of reducing the number of phase shifters 107 (transmitting amplifiers 108) in a case where Nsa is a parameter (Nsa=2, 3, 4, 8) with the number N of transmitting subarrays rendered variable from 2 to 8. As shown in FIG. 7, the larger N or Nsa becomes, the higher the effect of reducing the number of phase shifters 107 (transmitting amplifiers 108) becomes.

In this way, Example Antenna Arrangement 1 makes it possible to reduce the circuit size (e.g. the number of phase shifters) of transmitting subarrays in a MIMO radar while suppressing side-lobe or grating-lobe components.

It should be noted that although FIGS. 6A and 6B have shown examples in which, N=2, Nsa=3, and the transmitting antennas 109 and the receiving antennas 202 are arranged in the horizontal direction, this is not intended to limit the numbers of antennas or the direction in which the antennas are arranged. The same applies to the other antennas described below.

Example Antenna Arrangement 2

FIGS. 8A to 8C show examples of an arrangement of transmitting subarrays, an arrangement of receiving antennas 202, and an arrangement of a virtual receiving array, respectively, in Example Antenna Arrangement 2.

Example Antenna Arrangement 2 shows an antenna arrangement in which the number N of transmitting subarrays is 3 and the number Nsa of transmitting antennas 109 that each of the transmitting subarrays includes is 3.

As shown in FIG. 8A, five transmitting antennas #1 to #5 are placed at regular spacings of a predetermined value $d_H$ in a predetermined direction (e.g. a horizontal direction). Further, as shown in FIG. 8A, each of the transmitting subarrays #1 and #3 includes the same number (3 (=Nsa)) of transmitting antennas 109. Specifically, the transmitting subarray #1 includes the transmitting antennas #1 to #3, the transmitting subarray #2 includes the transmitting antennas #2 to #4, and the transmitting subarray #3 includes the transmitting antennas #3 to #5. That is, adjacent transmitting subarrays share (Nsa−1)=2 transmitting antennas 109 with each other.

Further, in FIG. 8A, each of the transmitting subarray spacings between the transmitting subarrays #1, #2, and #3 is $d_H$.

Further, as shown in FIG. 8B, the number of receiving antennas 202 is 3 (=Na). The interelement spacings (configuration spacings) between receiving antennas 202 take on a value that is equal to or greater than a value ($d_H \times N$) obtained by multiplying the transmitting subarray spacing $d_H$ by the number N of transmitting subarrays. In FIG. 8B, N=3, and the interelement spacings between receiving antennas 202 are $3d_H$.

Further, as shown in FIG. 8C, the virtual receiving array obtained by the arrangement of transmitting subarrays of FIG. 8A and the arrangement of receiving antennas of FIG. 8B includes 9 (=N×Na=(3×3)) antenna elements. The antenna element numbers of the virtual receiving array shown in FIG. 8O (i.e. #1, #2, #3, #4, #5, #6, #7, #8, and #9, which are arranged in this order from the negative direction of the X axis toward the positive direction of the X axis) indicate numbers corresponding to the order of elements of the virtual receiving array correlation vector h(k, fs, w) shown in Eq. (4). The direction estimator 214 performs a direction estimation process with the virtual receiving array correlation vector h(k, fs, w), which represents signals received by the virtual receiving array shown in FIG. 8C.

Since the virtual receiving array shown in FIG. 8C includes 9 (=N×Na) antenna elements and has its transmitting subarrays placed at spacings $d_H$ as shown in FIG. 8A, the antenna elements of the virtual receiving array are placed at regular transmitting subarray spacings $d_H$.

With this, for example, in a case where $d_H=0.5\lambda$ with respect to the wavelength 2, of a carrier frequency, the radar apparatus 10 becomes able to, by using the virtual receiving array shown in FIG. 8C, form a direction-of-arrival estimation with suppressed grating-lobe components and side-lobe components over a wide range of ±90 degrees, thus bringing about an effect of reducing estimation errors in radar positioning.

It should be noted that in a case where $d_H$=each of the transmitting subarrays has a size of not smaller than $2d_H$ (i.e. one wavelength). Note, however, that by placing adjacent transmitting subarrays so that the adjacent transmitting subarrays share transmitting antennas 109 with each other as shown in FIG. 8A, the transmitting subarray spacing ($d_H$) can be made narrower than the size ($2d_H$) of each of the transmitting subarrays. Further, by placing adjacent transmitting subarrays so that the adjacent transmitting subarrays share transmitting antennas 109 with each other, the number of transmitting antennas 109 of the radar transmitter 100 and the numbers of phase shifters 107 and transmitting amplifiers 108 that correspond to the transmitting antennas 109 can be reduced.

For example, in a case where, as shown in FIG. 8A, the number N of transmitting subarrays is 3, each of the transmitting subarrays includes the same number (3 (=Nsa)) of transmitting antennas 109, and the number of transmitting antennas 109 that adjacent transmitting subarrays share with each other is 2 (=Nsa−1), the number of transmitting antennas 109, i.e. the number of phase shifters 107 (transmitting amplifiers 108), is Nsa+(N−1)=3+(3−1)=5. This shows that Example Antenna Arrangement 2 brings about an effect of reducing the number of phase shifters 107 (transmitting amplifiers 108) to 5/9 as compared with a case where transmitting subarrays share no transmitting antennas with each other (N×Nsa=3×3=9).

Example Antenna Arrangement 3

Example Antenna Arrangements 1 and 2 (FIGS. 6A to 6C and 8A to 8C) have described cases where the number (Nsa) of transmitting antennas 109 that each of the transmitting subarrays includes and the number (Nsa−1) of transmitting antennas 109 that adjacent transmitting subarrays share with each other are equal. On the other hand, Example Antenna Arrangement 3 describes a case where the number of antennas that each of the transmitting subarrays includes and the number of transmitting antennas 109 that adjacent transmitting subarrays share with each other are different.

FIGS. 9A to 9C show examples of an arrangement of transmitting subarrays, an arrangement of receiving antennas 202, and an arrangement of a virtual receiving array, respectively, in Example Antenna Arrangement 3.

In FIG. 9A, six transmitting antennas #1 to #6 are placed at regular spacings of a predetermined value $d_H$ in a predetermined direction (e.g. a horizontal direction). Further, each of the transmitting subarrays #1 and #3 includes the same number (3 (=Nsa)) of transmitting antennas 109. The transmitting subarray #1 includes the transmitting antennas #1 to #3, the transmitting subarray #2 includes the transmitting antennas #1 to #5, and the transmitting subarray #3 includes the transmitting antennas #2 to #6. For this reason, the transmitting subarrays #1 and #2 share three transmitting antennas 109 with each other. The transmitting subarrays #2 and #3 share four transmitting antennas 109 with each other.

Example Antenna Arrangement 3 shows an antenna arrangement in which the number N of transmitting subarrays is 3.

As shown in FIG. 9A, six transmitting antennas #1 to #6 are placed at regular spacings of a predetermined value $d_H$ in a predetermined direction (e.g. a horizontal direction). Further, as shown in FIG. 9A, the transmitting subarrays #1 to #3 include three, five, and five transmitting antennas 109, respectively. That is, the numbers Nsa of transmitting antennas that the transmitting subarrays #1 to #3 include, respectively, are different.

Further, as shown in FIG. 9A, the transmitting subarrays #1 and #2 share three transmitting antennas 109 with each other, and the transmitting subarrays #2 and #3 share four transmitting antennas 109 with each other.

Further, in FIG. 9A, each of the transmitting subarray spacings between the transmitting subarrays #1, #2, and #3 is $d_H$.

Further, as shown in FIG. 9B, the number of receiving antennas 202 is 3 (=Na). The interelement spacings (configuration spacings) between receiving antennas 202 take on a value that is equal to or greater than a value ($d_H \times N$) obtained by multiplying the transmitting subarray spacing $d_H$ by the number N of transmitting subarrays. In FIG. 9B, N=3, and the interelement spacings between receiving antennas 202 are $3d_H$.

Further, as shown in FIG. 9C, the virtual receiving array obtained by the arrangement of transmitting subarrays of FIG. 9A and the arrangement of receiving antennas of FIG. 9B includes 9 (=N×Na=(3×3)) antenna elements. The antenna element numbers of the virtual receiving array shown in FIG. 9C (i.e. #1, #2, #3, #4, #5, #6, #7, #8, and #9, which are arranged in this order from the negative direction of the X axis of FIG. 9C toward the positive direction of the X axis) indicate numbers corresponding to the order of elements of the virtual receiving array correlation vector h(k, fs, w) shown in Eq. (4). The direction estimator 214 performs a direction estimation process with the virtual receiving array correlation vector h(k, fs, w), which represents signals received by the virtual receiving array shown in FIG. 9C.

Since the virtual receiving array shown in FIG. 9C includes 9 (=N×Na) antenna elements and has its transmitting subarrays placed at spacings $d_H$ as shown in FIG. 9A, the antenna elements of the virtual receiving array are placed at regular transmitting subarray spacings $d_H$.

With this, for example, in a case where $d_H$=0.5λ with respect to the wavelength of a carrier frequency, the radar apparatus 10 becomes able to, by using the virtual receiving array shown in FIG. 9C, form a direction-of-arrival estimation with suppressed grating-lobe components and side-lobe components over a wide range of ±90 degrees, thus bringing about an effect of reducing estimation errors in radar positioning.

It should be noted that in a case where $d_H$=0.5λ each of the transmitting subarrays has a size of not smaller than $2d_H$ (i.e. one wavelength). Note, however, that by placing adjacent transmitting subarrays so that the adjacent transmitting subarrays share transmitting antennas 109 with each other as shown in FIG. 9A, the transmitting subarray spacing ($d_H$) can be made narrower than the size ($2d_H$) of each of the transmitting subarrays. Further, by placing adjacent transmitting subarrays so that the adjacent transmitting subarrays share transmitting antennas 109 with each other, the number of transmitting antennas 109 of the radar transmitter 100 and the numbers of phase shifters 107 and transmitting amplifiers 108 that correspond to the transmitting antennas 109 can be reduced.

For example, as shown in FIG. 9A, the number N of transmitting subarrays is 3, the transmitting subarrays #1 to #3 include three, five, and five transmitting antennas 109, respectively, the transmitting subarrays #1 and #2 share three transmitting antennas 109 with each other, and the transmitting subarrays #2 and #3 share four transmitting antennas 109 with each other. In this case, the number of transmitting antennas 109 is 6. That is, the number of phase shifters 107 is 6, and the number of transmitting amplifiers 108 is 6. This shows that Example Antenna Arrangement 3 brings about an effect of reducing the number of phase shifters 107 (transmitting amplifiers 108) to 6/13 as compared with a case where transmitting subarrays share no transmitting antennas with each other (3+5+5=13).

Example Antenna Arrangement 4

In Example Antenna Arrangements 1 to 3 (FIGS. 6A to 6C, 8A to 8C, and 9A to 9C), which show configurations in which transmitting subarrays (transmitting antennas 109) and receiving antennas 202 are arranged in a predetermined direction (e.g. a horizontal direction), the direction estimator 214 is configured to perform radar positioning in the predetermined direction (e.g. the horizontal direction (azimuth direction)).

However, this is not intended to limit the direction in which the transmitting subarrays and the receiving antennas 202 are arranged. For example, an alternative configuration may be one in which the transmitting subarrays and the receiving antennas 202 are arranged in a vertical direction. In this case, the direction estimator 214 becomes capable of radar positioning in the vertical direction (elevation angle direction).

An alternative configuration may be one in which the transmitting subarrays are arranged in the vertical direction and the receiving antennas 202 are arranged in the horizontal direction. In this case, the direction estimator 214 becomes capable of radar positioning both in the vertical direction (elevation angle direction) and in the horizontal direction (azimuth direction). It should be noted that an alternative configuration may be one in which the transmitting subarrays are arranged in the horizontal direction and the receiving antennas 202 are arranged in the vertical direction.

Further, although Example Antenna Arrangements 1 to 3 (FIGS. 6A to 6C, 8A to 8C, and 9A to 9C) have described cases where the transmitting subarrays are linearly arranged, the transmitting subarrays may be planarly arranged both in the vertical direction and in the horizontal direction.

Figure 10A:
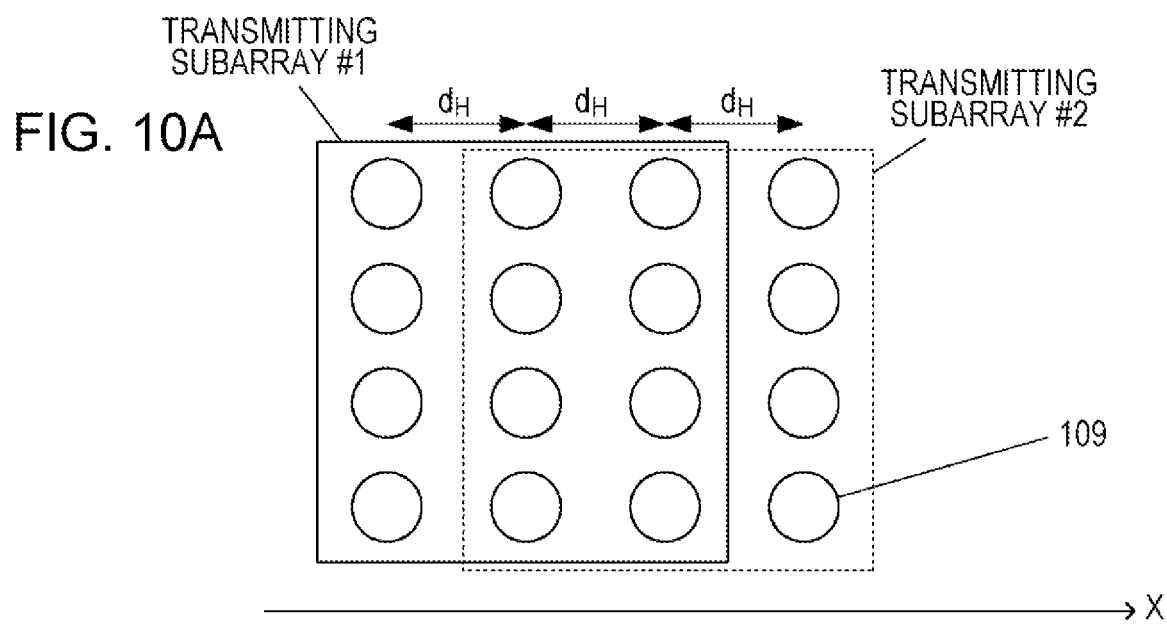
FIG. 10A shows an example arrangement of transmitting subarrays according to Example Antenna Arrangement 4.
Figure 10B:
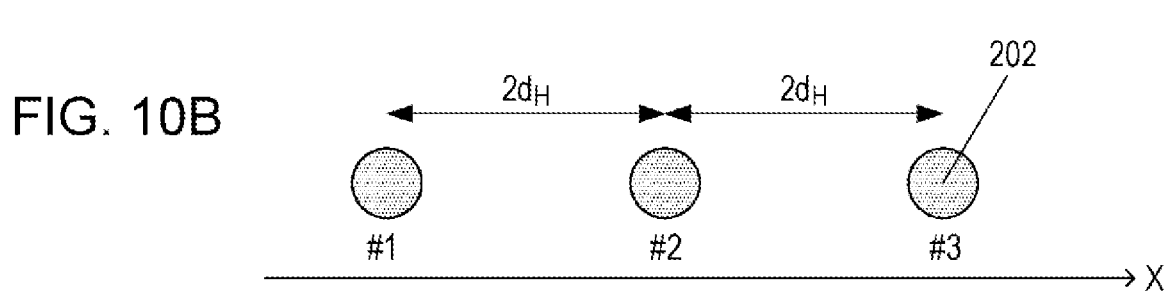
FIG. 10B shows an example arrangement of receiving antennas according to Example Antenna Arrangement 4.
Figure 10C:
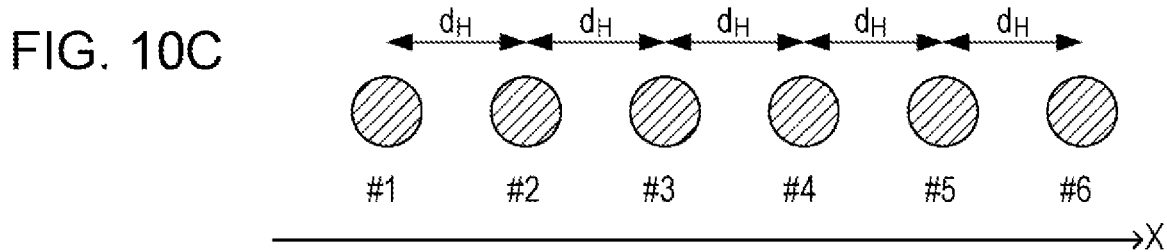
FIG. 10C shows an example arrangement of a virtual receiving array according to Example Antenna Arrangement 4.

FIGS. 10A to 10C illustrate Example Antenna Arrangement 4, which shows examples of an arrangement of transmitting subarrays, an arrangement of receiving antennas 202, and an arrangement of a virtual receiving array in a case where the transmitting subarrays are planarly arranged. Providing the transmitting subarrays as shown in FIG. 10A enables the radar apparatus 10 to form a transmitted beam with its directivity narrowed down in the vertical direction (elevation angle direction) as well as in the horizontal direction (azimuth direction), thus making it possible to further enhance the directivity gain of the transmitting subarrays. Although the directional beam direction of the elevation angle direction may be fixed in a desired direction, rendering the beam direction variable also in the elevation angle direction makes it possible to widen the angle of the range of detection both in the horizontal direction and in the elevation angle direction.

The foregoing has described Example Antenna Arrangements 1 to 4 according to Embodiment 1.

Thus, in Embodiment 1, a radar apparatus 10 includes a radar transmitter 100 that transmits radar transmission signals while switching among a plurality of transmitting subarrays each including a plurality of transmitting antennas 109 and phase shifters 107; and a radar receiver 200 that receives, through a plurality of receiving antennas 202, reflected-wave signals produced by the radar transmission signals being reflected by a target. Further, in Embodiment 1, adjacent ones of the plurality of transmitting subarrays share at least one of the transmitting antennas 109 and at least one of the phase shifters 107 with each other.

This makes it possible to reduce the number of transmitting antennas 109 in the radar transmitter 100 including the plurality of transmitting subarrays and the number of phase shifters 107 that correspond to the transmitting antennas 109. Further, by causing adjacent transmitting subarrays to share transmitting antennas 109 with each other, the spacing between the adjacent transmitting subarrays can be made narrower. Therefore, Embodiment 1 makes it possible to suppress an increase in circuit size of the radar apparatus 10.

Further, in Embodiment 1, the configuration spacing between adjacent ones of the plurality of receiving antennas 202 takes on a value that is equal to or greater than a value $(d_H \times N)$ obtained by multiplying the configuration spacing $(d_H)$ between transmitting subarrays by the number (N) of transmitting subarrays. This causes the antenna elements of the virtual receiving array based on the arrangement of the transmitting subarrays and the arrangement of the receiving antennas 202 to be placed at regular spacings $d_H$. As mentioned above, narrowing the spacing between adjacent transmitting subarrays, for example, to one wavelength (e.g. $d_H$=0.5λ) or shorter makes it possible to also set the antenna interelement spacing of the virtual receiving array to be one wavelength (e.g. $d_H$=0.5λ or shorter, thus making it possible to suppress angle-side-lobe or grating-lobe components.

Thus, Embodiment 1 makes it possible to reduce the circuit size (e.g. the number of phase shifters) of transmitting subarrays in a MIMO radar while suppressing side-lobe or grating-lobe components.

Embodiment 2

Those components of a radar apparatus according to Embodiment 2 which are identical to those of the radar apparatus 10 according to Embodiment 1 are described with reference to FIG. 1.

Embodiment 2 describes a configuration in which receiving antennas 202 are not only arranged in a predetermined direction (e.g. a horizontal direction) but also arranged with a displacement in a direction (vertical direction) perpendicular to the predetermined direction. This antenna arrangement enables the radar apparatus 10 to form a direction-of-arrival estimation both in the horizontal direction and in the elevation angle direction.

Example Antenna Arrangement 5

Figure 11A:
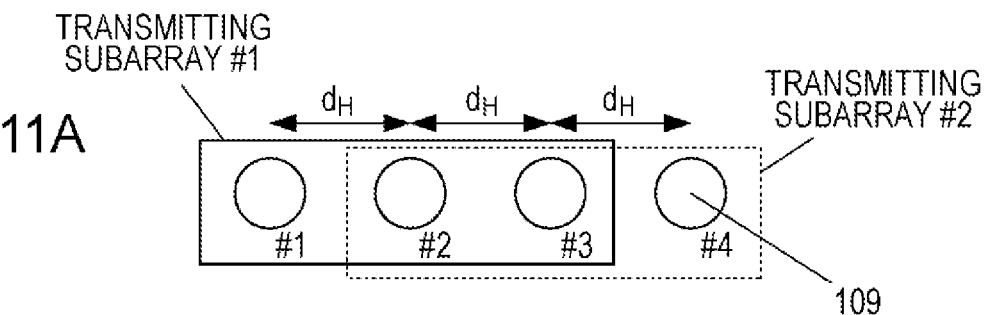
FIG. 11A shows an example arrangement of transmitting subarrays according to Example Antenna Arrangement 5.
Figure 11B:
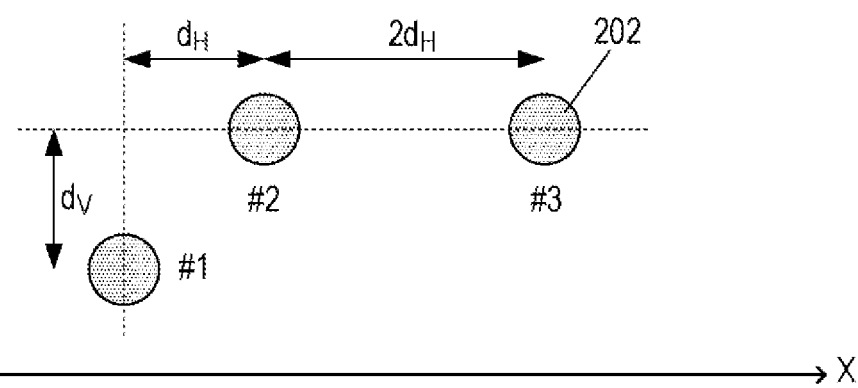
FIG. 11B shows an example arrangement of receiving antennas according to Example Antenna Arrangement 5.
Figure 11C:
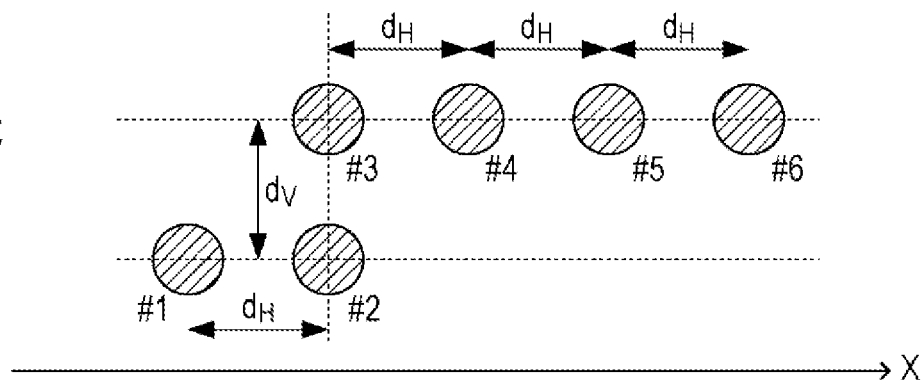
FIG. 11C shows an example arrangement of a virtual receiving array according to Example Antenna Arrangement 5.

FIGS. 11A to 11C show examples of an arrangement of transmitting subarrays, an arrangement of receiving antennas 202, and an arrangement of a virtual receiving array, respectively, in Example Antenna Arrangement 5.

Example Antenna Arrangement 5 shows an antenna arrangement in which the number N of transmitting subarrays is 2 and the number Nsa of transmitting antennas 109 that each of the transmitting subarrays includes is 3.

As shown in FIG. 11A, four transmitting antennas #1 to are placed at regular spacings of a predetermined value $d_H$ in a horizontal direction. Further, as shown in FIG. 11A, each of the transmitting subarrays #1 and #2 includes the same number (3 (=Nsa)) of transmitting antennas 109. Further, the adjacent transmitting subarrays share (Nsa−1)= 2 transmitting antennas 109 (in FIG. 11A, the transmitting antennas #2 to #3) with each other.

Further, in FIG. 11A, the transmitting subarray spacing between the transmitting subarrays #1 and #2 is $d_H$.

Further, as shown in FIG. 11B, the number of receiving antennas 202 is 3 (=Na). Note here that the receiving antennas #1 to #3 include at least one receiving antenna 202 (in FIG. 11B, the receiving antenna #1) displaced at a spacing of a predetermined value $d_V$ in a vertical direction. Further, the interelement spacings (configuration spacings) between receiving antennas 202 in the horizontal direction include the transmitting subarray spacing $d_H$ and a value that is equal to or greater than a value $(d_H \times N)$ obtained by multiplying the transmitting subarray spacing $d_H$ by the number N of transmitting subarrays. In FIG. 11B, N=2, and the interelement spacings between receiving antennas 202 are $d_H$ and $2d_H$.

Further, as shown in FIG. 11C, the virtual receiving array obtained by the arrangement of transmitting subarrays of FIG. 11A and the arrangement of receiving antennas of FIG. 11B includes 6 (=N×Na=(2×3)) antenna elements. The antenna element numbers of the virtual receiving array shown in FIG. 11C (i.e. #1, #2, #3, #4, #5, and #6, which are arranged in this order from the negative direction of the X axis toward the positive direction of the X axis) indicate numbers corresponding to the order of elements of the virtual receiving array correlation vector h(k, fs, w) shown in Eq. (4). The direction estimator 214 performs a direction estimation process with the virtual receiving array correlation vector h(k, fs, w), which represents signals received by the virtual receiving array shown in FIG. 11C.

The virtual receiving array shown in FIG. 11C includes 6 (=N×Na) antenna elements. The transmitting subarrays are placed at spacings $d_H$ in the horizontal direction as shown in FIG. 11A. At least one of the receiving antennas 202 is displaced at a spacing $d_V$ in the vertical direction as shown in FIG. 11B. The receiving antennas 202 are placed at spacings $d_H$ and $2d_H$ in the horizontal direction. With all these factors, the antenna elements of the virtual receiving array form at least two sets of antenna elements (i.e. the set of antenna element numbers #1 and #2 and the set of antenna element numbers #3, #4, #5, and #6 of FIG. 11C) arranged with a displacement at a spacing $d_V$ in the vertical direction and placed at regular spacings $d_H$ in the horizontal direction. Further, in FIG. 11C, at least two horizontally co-located antennas (#2 and #3) are arranged side by side in the vertical direction.

The direction estimator 214 performs a direction estimation process as a horizontal direction estimation process through a set of vertically co-located antennas of the virtual receiving array (in the case of FIG. 11C, the set of antenna element numbers #3, #4, #5, and #6 or the set of antenna element numbers #1 and #2). Further, the direction estimator 214 performs a direction estimation process as a vertical direction estimation process through a set of horizontally co-located antennas of the virtual receiving array (in the case of FIG. 11C, the set of antenna element numbers #2 and #3). That is, the direction estimator 214 can form a direction-of-arrival estimation both in the horizontal direction and in the elevation angle direction.

With this, for example, in a case where $d_H$=0.5λ with respect to the wavelength of a carrier frequency, the radar apparatus 10 becomes able to, by using the virtual receiving array shown in FIG. 11C, form a direction-of-arrival estimation with suppressed grating-lobe components and side-lobe components over a wide range of ±90 degrees, thus bringing about an effect of reducing estimation errors in radar positioning.

It should be noted that in a case where $d_H=0.5\lambda$, each of the transmitting subarrays has a size of not smaller than $2d_H$ (i.e. one wavelength). Note, however, that by placing adjacent transmitting subarrays so that the adjacent transmitting subarrays share transmitting antennas 109 with each other as shown in FIG. 11A, the transmitting subarray spacing ($d_H$) can be made narrower than the size ($2d_H$) of each of the transmitting subarrays. Further, by placing adjacent transmitting subarrays so that the adjacent transmitting subarrays share transmitting antennas 109 with each other, the number of transmitting antennas 109 of the radar transmitter 100 and the numbers of phase shifters 107 and transmitting amplifiers 108 that correspond to the transmitting antennas 109 can be reduced.

For example, in a case where, as shown in FIG. 11A, the number N of transmitting subarrays is 2, each of the transmitting subarrays includes the same number (3 (=Nsa)) of transmitting antennas 109, and the number of transmitting antennas 109 that adjacent transmitting subarrays share with each other is 2 (=Nsa−1), the number of transmitting antennas 109, i.e. the number of phase shifters 107 (transmitting amplifiers 108), is Nsa+(N−1)=3+(3−1)=4. This shows that Example Antenna Arrangement 5 makes it possible to reduce the number of phase shifters 107 (transmitting amplifiers 108) to ⅔ as compared with a case where transmitting subarrays share no transmitting antennas with each other (N×Nsa=2×3=6).

Another Configuration of Direction Estimator

It should be noted that, without being limited to the process of the direction estimator 214, it is possible to perform a two-dimensional estimation process, for example, by configuring an array antenna (hereinafter referred to as "virtually planarly arranged array antenna") virtually planarly arranged on the basis of a virtual receiving array.

Figure 12:
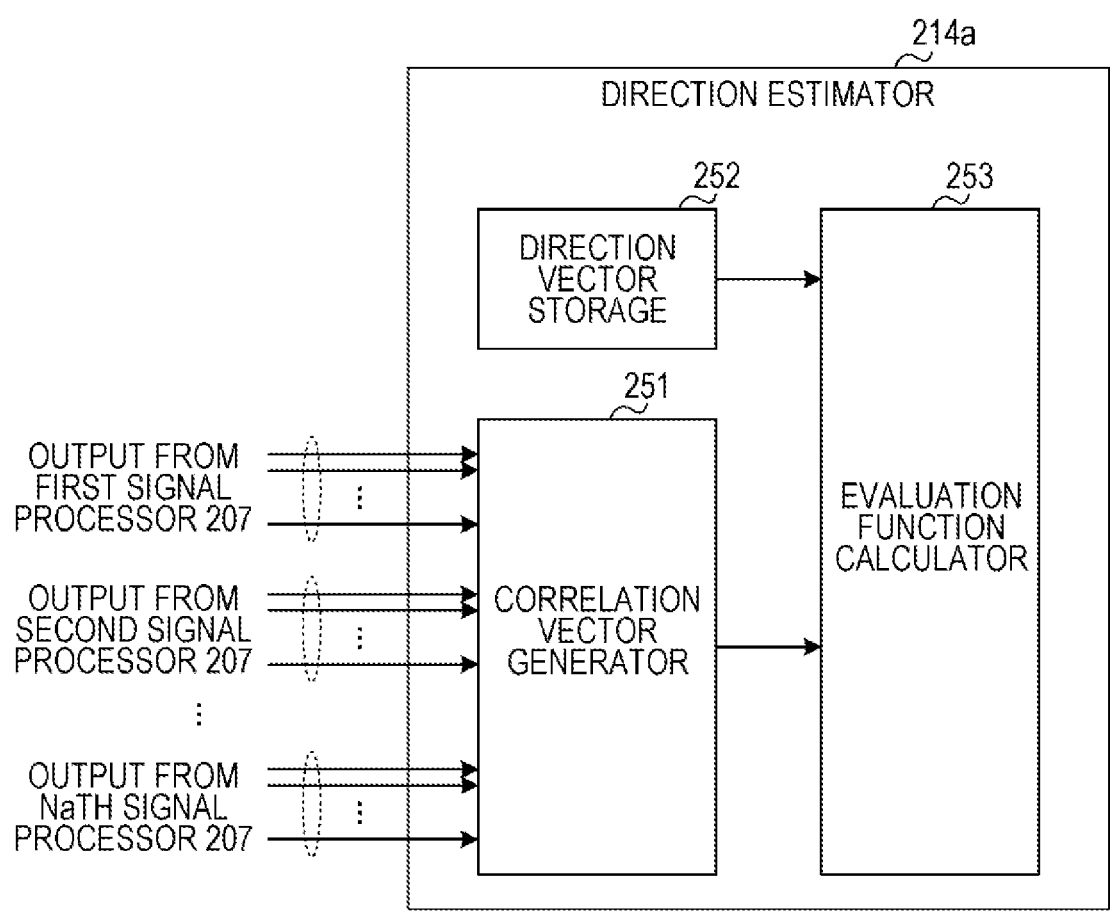
FIG. 12 is a block diagram showing another configuration of a direction estimator according to Embodiment 2.

For example, the radar receiver 200 may include a direction estimator 214a shown in FIG. 12 instead of including the direction estimator 214. The direction estimator 214a includes a correlation vector generator 251, a direction vector storage 252, and an evaluation function calculator 253. The direction estimator 214a (correlation vector generator 251) receives the virtual receiving array correlation vector h(k, fs, w), which represents an output obtained at each of the Na signal processors 207.

Figure 13:
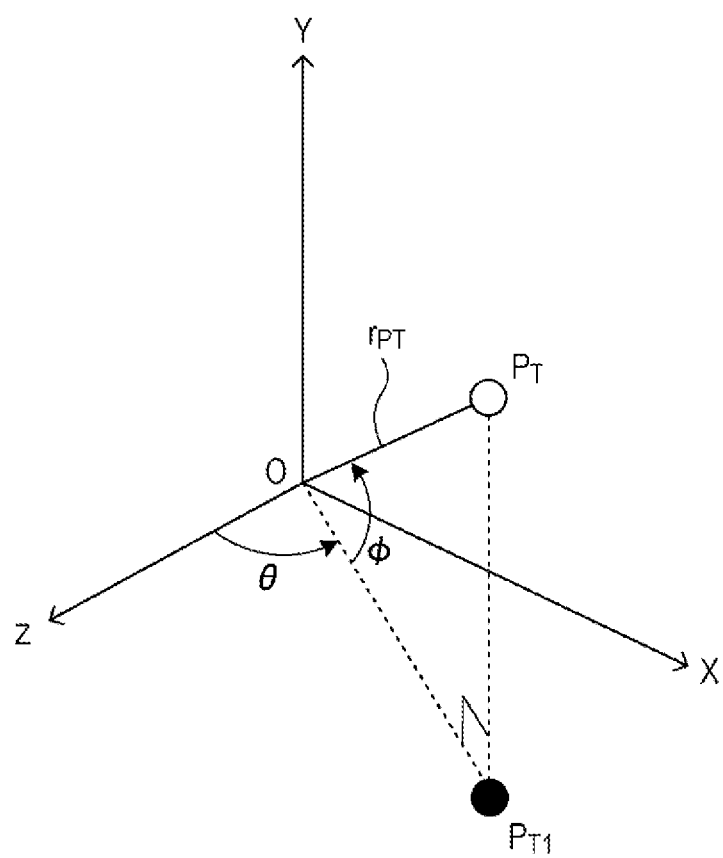
FIG. 13 shows a three-dimensional coordinate system that is used to describe an operation of the direction estimator according to Embodiment 2.

FIG. 13 shows a three-dimensional coordinate system that is used to describe an operation of the direction estimator 214a.

In FIG. 13, the position vector of a target $P_T$ with reference to the origin O is defined as $r_{PT}$. Further, in FIG. 13, $P_{T1}$ is a projective point at which the position vector $r_{PT}$ of the target $P_T$ is projected onto the X-Z plane. In this case, the azimuth angle θ is defined as an angle formed by the straight line O-$P_{T1}$ and the Z axis (in a case where the X coordinate of the target $P_T$ is positive, θ>0). Further, the elevation angle φ is defined as the angle of a line connecting the target $P_T$, the origin O, and the projective point $P_{T1}$ in a plane including the target $P_T$, the origin O, and the projective point $P_{T1}$ (in a case where the X coordinate of the target $P_T$ is positive, φ>0). It should be noted that the following describes, as an example, a case where transmitting antennas 109 and receiving antennas 202 are arranged in the X-Y plane.

The position vector of the $n_{va}$th antenna element of the virtual receiving array with reference to the origin O is denoted as $Sn_{va}$. Note here that $n_{va}=1, \ldots, N \times Na$.

Further, the position vector $S_1$ of the first ($n_{va}=1$) antenna element of the virtual receiving array is determined on the basis of a positional relationship between the physical location of the first receiving antenna 202 and the origin O. The position vectors $S_2, \ldots, Sn_{va}$ of the other antenna elements of the virtual receiving array are determined with reference to the position vector $S_1$ of the first antenna element in a state of retention of a relative arrangement of the virtual receiving array as determined from the interelement spacings between transmitting antennas 109 and receiving antennas 202 that are present in the X-Y plane. It should be noted that the origin O may coincide with the physical location of the first receiving antenna 202.

In a case where the radar receiver 200 receives a reflected wave from a target $P_T$ that is present in a distant field, the phase difference $d(r_{PT}, 2, 1)$ of a received signal at the second antenna element with reference to a received signal at the first antenna element of the virtual receiving array is represented by Eq. (12). Note here that <x, y> is the inner product operator of the vector x and the vector y.

$$d(r_{PT}, 2, 1) = -\frac{2\pi}{\lambda} \frac{\langle -r_{PT}, (s_2-s_1)\rangle}{|r_{PT}|} = \frac{2\pi}{\lambda}\left\langle \frac{r_{PT}}{|r_{PT}|}, (s_2-s_1)\right\rangle = \frac{2\pi}{\lambda}\left\langle \frac{r_{PT}}{|r_{PT}|}, D(2,1)\right\rangle \quad (12)$$

It should be noted that the position vector of the second antenna element with reference to the position vector of the first antenna element of the virtual receiving array is represented as the interelement vector D(2, 1) by Eq. (13).

$$D(2,1)=S_2-S_1 \quad (13)$$

Similarly, in a case where the radar receiver 200 receives a reflected wave from a target $P_T$ that is present in a distant field, the phase difference $d(r_{PT}, n_{va}^{(t)}, n_{va}^{(r)})$ of a received signal at the $n_{va}^{(t)}$th antenna element with reference to a received signal at the $n_{va}^{(r)}$th antenna element of the virtual receiving array is represented by Eq. (14). Note here that $n_{va}^{(r)}=1, \ldots, N \times Na$ and $n_{va}^{(t)}=1, \ldots, N \times Na$.

$$d(r_{PT}, n_{va}^{(t)}, n_{va}^{(r)}) = \frac{2\pi}{\lambda}\left\langle \frac{r_{PT}}{|r_{PT}|}, D(n_{va}^{(t)}, n_{va}^{(r)})\right\rangle \quad (14)$$

It should be noted that the position vector of the $n_{va}^{(t)}$th antenna element with reference to the position vector of the $n_{va}^{(r)}$th antenna element of the virtual receiving array is represented as the interelement vector $D(n_{va}^{(t)}, n_{va}^{(r)})$ by Eq. (15).

$$D(n_{va}^{(t)}, n_{va}^{(r)})=S_{n_{va}^{(t)}}-S_{n_{va}^{(r)}} \quad (15)$$

As indicated by Eq. (14) and Eq. (15), the phase difference $d(r_{PT}, n_{va}^{(t)}, n_{va}^{(r)})$ of a received signal at the $n_{va}^{(t)}$th antenna element with reference to a received signal at the $n_{va}^{(r)}$th antenna element of the virtual receiving array depends on the unit vector ($r_{PT}/|r_{PT}|$) and the interelement vector $D(n_{va}^{(t)}, n_{va}^{(r)})$, which represent the direction of a target $P_T$ that is present in a distant field.

Further, in a case where the virtual receiving array is present in the same plane, the interelement vector $D(n_{va}^{(t)}, n_{va}^{(r)})$ is present on the same plane. The direction estimator 214a uses some or all of such interelement vectors to configure a virtually planarly arranged array antenna assuming that the antenna elements are virtually located in the positions indicated by the interelement vectors and performs a two-dimensional direction estimation process. That is, the direction estimator 214a performs a direction-of-arrival estimation process through a plurality of virtual antenna elements interpolated by an interpolation process on the antenna elements constituting the virtual receiving array.

It should be noted that in a case where virtual antenna elements overlap, the direction estimator 214a may fixedly select one of the overlapping antenna elements in advance. Alternatively, the direction estimator 214a may perform an addition averaging process with received signals at all of the overlapping virtual antenna elements.

The following describes a two-dimensional direction estimation process with a beamformer method in the case of a virtually planarly arranged array antenna configured by using $N_q$ interelement vector groups.

Note here that the nqth interelement vector that constitutes the virtually planarly arranged array antenna is represented by $D(n_{va(nq)}^{(t)}, n_{va(nq)}^{(r)})$. Note here that nq=1, ..., $N_q$.

The correlation vector generator 251 generates a virtually planarly arranged array antenna correlation vector $h_{VA}(k, fs, w)$ represented by Eq. (16), using $h_1(k, fs, w), \ldots, h_{Na \times N}(k, fs, w)$, which are the elements of the virtual receiving array correlation vector $h_{\_after\_cal}(k, fs, w)$.

$$h_{VA}(k, fs, w) = \begin{pmatrix} h_{n_{va(1)}^{(t)}}(k, fs, w) h_{n_{va(1)}^{(r)}}^*(k, fs, w) / \left| h_{n_{va(1)}^{(r)}}^*(k, fs, w) \right| \\ h_{n_{va(2)}^{(t)}}(k, fs, w) h_{n_{va(2)}^{(r)}}^*(k, fs, w) / \left| h_{n_{va(2)}^{(r)}}^*(k, fs, w) \right| \\ \vdots \\ h_{n_{va(Nq)}^{(t)}}(k, fs, w) h_{n_{va(Nq)}^{(r)}}^*(k, fs, w) / \left| h_{n_{va(Nq)}^{(r)}}^*(k, fs, w) \right| \end{pmatrix} \quad (16)$$

The direction vector storage 252 stores a virtually planarly arranged array direction vector $a_{VA}(\theta u, \varphi v)$ represented by Eq. (17).

$$a_{VA}(\theta_u, \phi_v) = \begin{bmatrix} \exp\left\{ j\frac{2\pi}{\lambda} \left\langle \frac{r_{PT}(\theta_u, \phi_v)}{|r_{PT}(\theta_u, \phi_v)|}, D(n_{va(1)}^{(t)}, n_{va(1)}^{(r)}) \right\rangle \right\} \\ \exp\left\{ j\frac{2\pi}{\lambda} \left\langle \frac{r_{PT}(\theta_u, \phi_v)}{|r_{PT}(\theta_u, \phi_v)|}, D(n_{va(2)}^{(t)}, n_{va(2)}^{(r)}) \right\rangle \right\} \\ \vdots \\ \exp\left\{ j\frac{2\pi}{\lambda} \left\langle \frac{r_{PT}(\theta_u, \phi_v)}{|r_{PT}(\theta_u, \phi_v)|}, D(n_{va(Nq)}^{(t)}, n_{va(Nq)}^{(r)}) \right\rangle \right\} \end{bmatrix} \quad (17)$$

In a case where the virtual receiving array is present in the X-Y plane, a relationship between the unit vector $(r_{PT}/|r_{PT}|)$, which indicates the direction of the target $P_T$, and the azimuth angle θ and the elevation angle φ is represented by Eq. (18).

$$\frac{r_{PT}(\theta_u, \phi_v)}{|r_{PT}(\theta_u, \phi_v)|} = \begin{pmatrix} \sin\theta_u \cos\phi_v \\ \sin\phi \\ \cos\theta_u \cos\phi_v \end{pmatrix} \quad (18)$$

The direction estimator 214a calculates the unit vector $(r_{PT}/|r_{PT}|)$ according to Eq. (18) with respect to the angular directions θu and φv in which a horizontal and vertical two-dimensional spatial profile is calculated.

The evaluation function calculator 253 performs a horizontal and vertical two-dimensional direction estimation process with the virtually planarly arranged array antenna correlation vector $h_{VA}(k, fs, w)$ generated by the correlation vector generator 251 and the virtually planarly arranged array direction vector $a_{VA}(\theta u, \varphi v)$ stored in the direction vector storage 252.

In the two-dimensional direction estimation process with a beamformer method, the evaluation function calculator 253, using the virtually planarly arranged array antenna correlation vector $h_{VA}(k, fs, w)$ and the virtually planarly arranged array direction vector $a_{VA}(\theta u, \varphi v)$, calculates the horizontal and vertical two-dimensional spatial profile with a two-dimensional direction estimation evaluation function represented by Eq. (19) and sets, as a direction-of-arrival estimated value, the azimuth angle and the elevation angle direction that serve as the maximum values or maximal values of the two-dimensional spatial profile.

$$P_{VA}(\theta_u, \phi_v, k, fs, w) = |a_{VA}(\theta_u, \phi_v)^H h_{VA}(k, fs, w)|^2 \quad (19)$$

It should be noted that, instead of using a beamformer method, the direction estimator 214a may adopt, for example, a high-resolution direction-of-arrival estimation algorithm of the Capon method or MUSIC method using the virtually planarly arranged array antenna correlation vector $h_{VA}(k, fs, w)$ and the virtually planarly arranged array direction vector $a_{VA}(\theta u, \varphi v)$. This increases the amount of calculation but makes it possible to enhance angular resolution.

Figure 14:
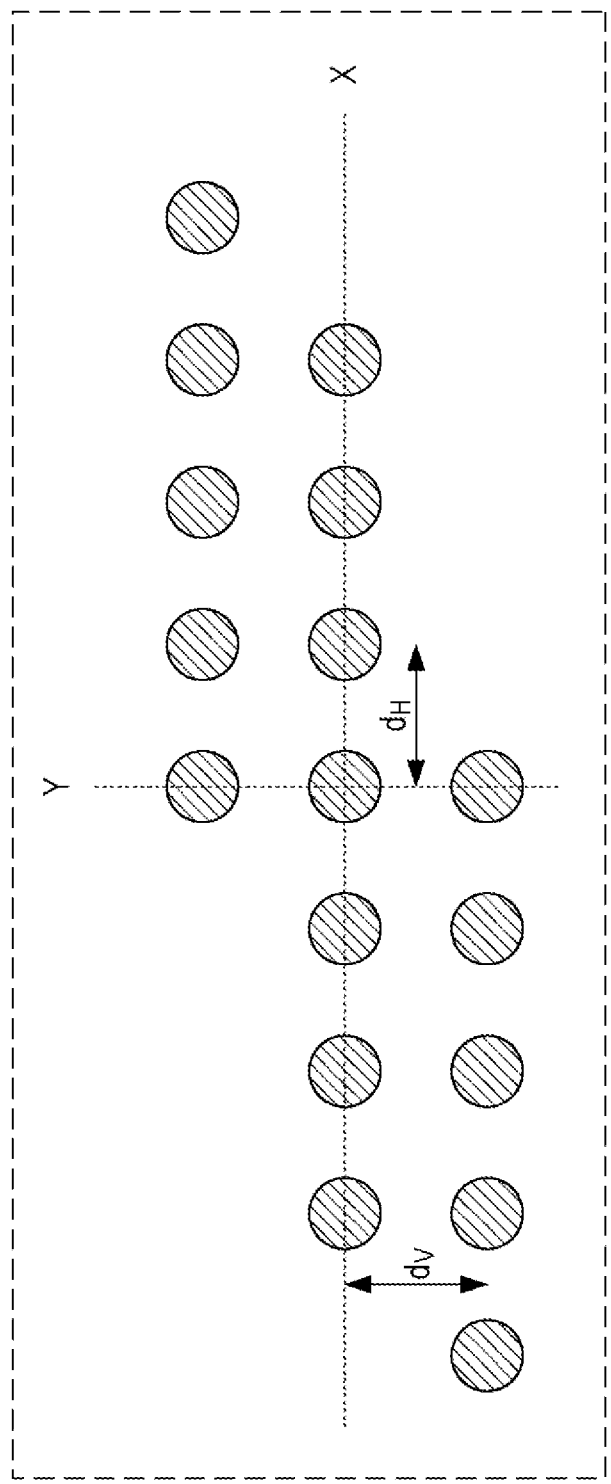
FIG. 14 shows an example arrangement of a virtually planarly arranged array antenna according to Example Antenna Arrangement 5.

FIG. 14 shows a virtually planarly arranged array antenna configured by using the configuration of an MIMO radar and arrangement of a virtual receiving array of Example Antenna Arrangement 5 (FIGS. 11A to 11C).

The virtual receiving array shown in FIG. 11C includes 6 (=N×Na) antenna elements. The transmitting subarrays are placed at spacings $d_H$ in the horizontal direction as shown in FIG. 11A. At least one of the receiving antennas 202 is displaced at a spacing $d_V$ in the vertical direction as shown in FIG. 11B. The receiving antennas 202 are placed at spacings $d_H$ and $2d_H$ in the horizontal direction. With all these factors, the antenna elements of the virtual receiving array form at least two sets of antenna elements (i.e. the set of antenna element numbers #1 and #2 and the set of antenna element numbers #3, #4, #5, and #6 of FIG. 11C) arranged with a displacement at a spacing $d_V$ in the vertical direction and placed at regular spacings $d_H$ in the horizontal direction. Further, in FIG. 11C, at least two horizontally co-located antennas (#2 and #3) are arranged side by side in the vertical direction. Meanwhile, in FIG. 14, the virtually planarly arranged array antenna, based on the virtual receiving array (FIG. 11C) having 6 (=N×Na) antenna elements in Example Antenna Arrangement 5, is configured to include a plurality of virtual antenna elements interpolated by the interpolation process shown in Eq. (15) and Eq. (16), assuming that the antenna elements are virtually located in positions respectively indicated by six interelement vectors $D(n_{va}^{(t)}, 1)$, $D(n_{va}^{(t)}, 2), \ldots, D(n_{va}^{(t)}, 6)$. Since $n_{va}^{(t)}=1, 6$ (=N×Na), the number of virtual antenna, elements is 36 (=6×6), unless the positions respectively indicated by the six interelement vectors $D(n_{va}^{(t)}, 1), D(n_{va}^{(t)}, 2), \ldots, D(n_{va}^{(t)}, 6)$ overlap. Note, however, that, in FIG. 14, the number of virtual antenna elements is 17, as the positions indicated by the interelement vectors partially overlap.

The seventeen antenna elements of such a virtually planarly arranged array antenna as that shown in FIG. 14 are placed at regular spacings $d_H$ in a horizontal direction or a vertical direction. With this, for example in a case where $d_H$=0.5λ, the radar apparatus 10 becomes able to, by using the virtually planarly arranged array antenna shown in FIG. 14, form a direction-of-arrival estimation with reduced occurrence of grating lobes in a range of ±90 degrees, thus bringing about an effect of reducing estimation errors in radar positioning.

Example Antenna Arrangement 6

Figure 15A:
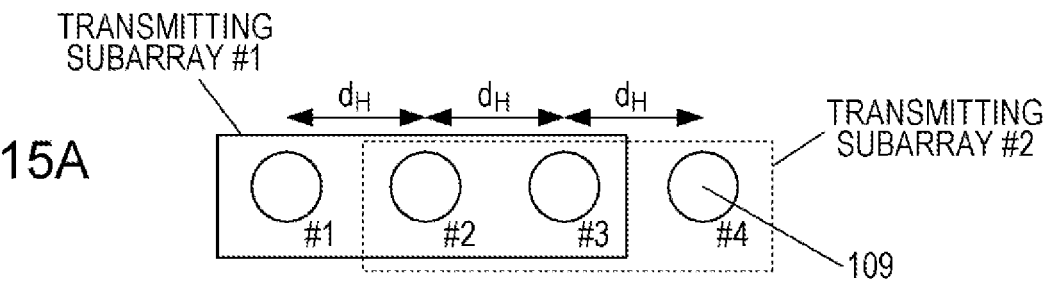
FIG. 15A shows an example arrangement of transmitting subarrays according to Example Antenna Arrangement 6.
Figure 15B:
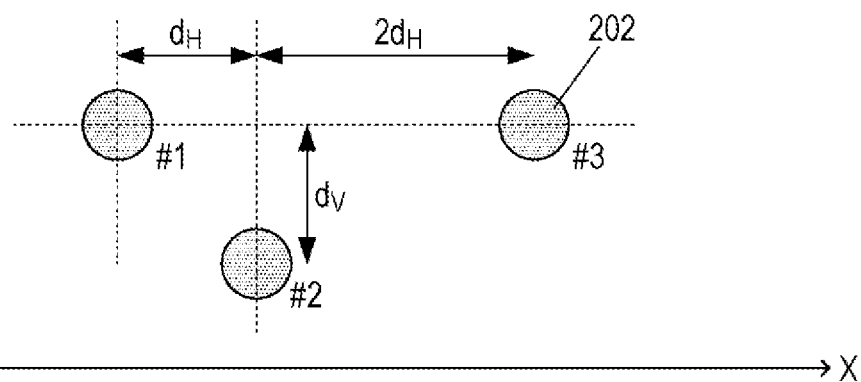
FIG. 15B shows an example arrangement of receiving antennas according to Example Antenna Arrangement 6.
Figure 15C:
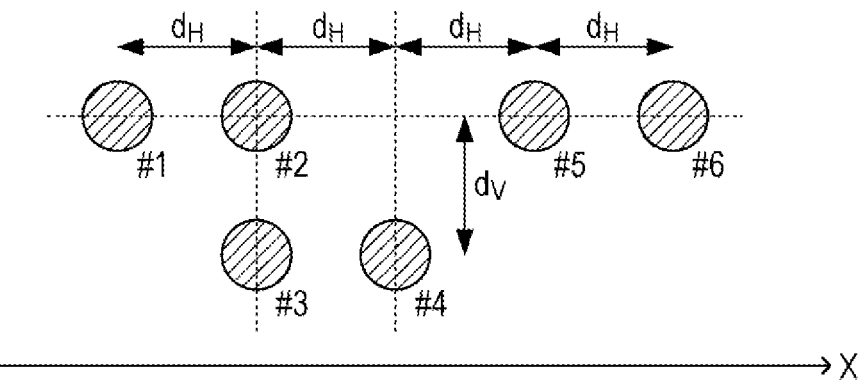
FIG. 15C shows an example arrangement of a virtual receiving array according to Example Antenna Arrangement 6.

FIGS. 15A to 15C show examples of an arrangement of transmitting subarrays, an arrangement of receiving antennas 202, and an arrangement of a virtual receiving array, respectively, in Example Antenna Arrangement 6.

Example Antenna Arrangement 6 shows an antenna arrangement in which the number N of transmitting subarrays is 2 and the number Nsa of transmitting antennas 109 that each of the transmitting subarrays includes is 3.

As shown in FIG. 15A, four transmitting antennas 109 are placed at regular spacings of a predetermined value $d_H$ in a horizontal direction. Further, as shown in FIG. 15A, each of the transmitting subarrays #1 and #2 includes the same number (3 (=Nsa)) of transmitting antennas 109. Further, the adjacent transmitting subarrays share (Nsa−1)=2 transmitting antennas 109 (in FIG. 15A, the transmitting antennas #2 to #3) with each other.

Further, in FIG. 15A, the transmitting subarray spacing between the transmitting subarrays #1 and #2 is $d_H$.

Further, as shown in FIG. 15B, the number of receiving antennas 202 is 3 (=Na). Note here that, as for the receiving antennas 202, the receiving antennas #1, #2, and #3 are provided in this order from the negative direction of the X axis of FIG. 15B toward the positive direction of the X axis. The receiving antennas 202 include at least one receiving antenna #2 displaced at a spacing of a predetermined value $d_V$ in a vertical direction. Further, the interelement spacings (configuration spacings) between receiving antennas 202 in the horizontal direction include the transmitting subarray spacing $d_H$ and a value that is equal to or greater than a spacing ($d_H \times N$) obtained by multiplying the transmitting subarray spacing $d_H$ by the number N of transmitting subarrays. In FIG. 15B, N=2, and the interelement spacings between receiving antennas 202 are $d_H$ and $2d_H$.

Further, as shown in FIG. 15C, the virtual receiving array obtained by the arrangement of transmitting subarrays of FIG. 15A and the arrangement of receiving antennas of FIG. 15B includes 6 (=N×Na=(2×3)) antenna elements. The antenna element numbers of the virtual receiving array shown in FIG. 15C (i.e. #1, #2, #3, #4, #5, and #6, which are arranged in this order from the negative direction of the X axis of FIG. 15C toward the positive direction of the X axis) indicate numbers corresponding to the order of elements of the virtual receiving array correlation vector h(k, fs, w) shown in Eq. (4). The direction estimator 214 performs a direction estimation process with the virtual receiving array correlation vector h(k, fs, w), which represents signals received by the virtual receiving array shown in FIG. 15C.

The virtual receiving array shown in FIG. 15C includes 6 (=N×Na) antenna elements. The transmitting subarrays are placed at spacings $d_H$ in the horizontal direction as shown in FIG. 15A. At least one of the receiving antennas 202 is displaced at a spacing $d_V$ in the vertical direction as shown in FIG. 15B. The receiving antennas 202 are placed at spacings $d_H$ and $2d_H$ in the horizontal direction. With all these factors, the antenna elements of the virtual receiving array form at least two sets of antenna elements (i.e. the set of antenna element numbers #1, #2, #5, and #6 and the set of antenna element numbers #3 and #4 of FIG. 15C) arranged with a displacement at a spacing $d_V$ in the vertical direction and placed at regular spacings $d_H$ in the horizontal direction. Further, in FIG. 15C, at least two horizontally co-located antennas (i.e. the antenna element numbers #2 and #3 of FIG. 15C) are arranged side by side in the vertical direction.

The direction estimator 214 performs a direction estimation process as a horizontal direction estimation process through a set of vertically co-located antennas of the virtual receiving array (in the case of FIG. 15C, the set of antenna element numbers #1, #2, #5, and #6 or the set of antenna element numbers #3 and #4). Further, the direction estimator 214 performs a direction estimation process as a vertical direction estimation process through a set of horizontally co-located antennas of the virtual receiving array (in the case of FIG. 15C, the set of antenna element numbers #2 and #3). That is, the direction estimator 214 can form a direction-of-arrival estimation both in the horizontal direction and in the elevation angle direction.

It should be noted that, instead of including the direction estimator 214, the radar receiver 200 may include the direction estimator 214a (FIG. 12), for example, to perform a two-dimensional estimation process by configuring a virtually planarly arranged array antenna on the basis of a virtual receiving array.

Figure 16:
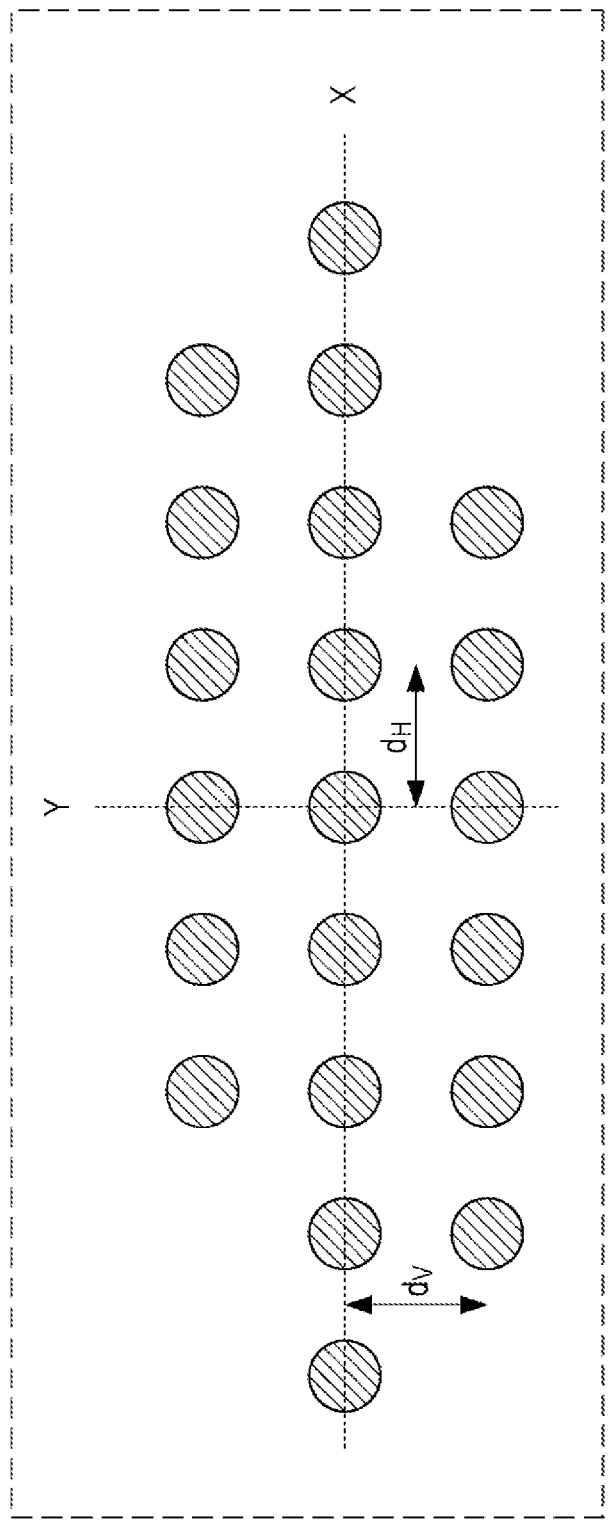
FIG. 16 shows an example arrangement of a virtually planarly arranged array antenna according to Example Antenna Arrangement 6.

FIG. 16 shows a virtually planarly arranged array antenna configured by using the configuration of an MIMO radar and arrangement of a virtual receiving array of Example Antenna Arrangement 6 (FIGS. 15A to 15O). Specifically, in FIG. 16, the virtually planarly arranged array antenna, based on the virtual receiving array having 6 (=N×Na) antenna elements in Example Antenna Arrangement 6, is configured, assuming that the antenna elements are virtually located in positions respectively indicated by six interelement vectors $D(n_{va}^{(t)}, 1)$, $D(n_{va}^{(t)}, 2)$, $D(n_{va}^{(t)}, 6)$. Since $n_{va}^{(t)}=1, \ldots, 6$ (=N×Na), the number of virtual antenna elements is 36 (=6×6), unless the positions respectively indicated by the six interelement vectors $D(n_{va}^{(t)}, 1)$, $D(n_{va}^{(t)}, 2)$, $\ldots$, $D(n_{va}^{(t)}, 6)$ overlap. Note, however, that, in FIG. 16, the number of virtual antenna elements is 21, as the positions indicated by the interelement vectors partially overlap.

The twenty-one antenna elements of such a virtually planarly arranged array antenna as that shown in FIG. 16 are placed at regular spacings $d_H$ in a horizontal direction or a vertical direction. With this, for example in a case where $d_H=0.5\lambda$, the radar apparatus 10 becomes able to, by using the virtually planarly arranged array antenna shown in FIG. 16, form a direction-of-arrival estimation with reduced occurrence of grating lobes in a range of ±90 degrees, thus bringing about an effect of reducing estimation errors in radar positioning.

Further, Example Antenna Arrangement 6 (FIG. 16) has a larger number of virtual antenna elements that are included in the virtually planarly arranged array antenna, has a more planarly uniform distribution of element arrangement, and therefore has less dependence of separation performance on angular directions than Example Antenna Arrangement 5 (FIG. 14) does.

The foregoing has described Example Antenna Arrangements 5 and 6 according to Embodiment 2.

Thus, in Embodiment 2, the radar apparatus 10 is configured such that the plurality of receiving antennas 202 are arranged in a first direction (e.g. a horizontal direction) in which the plurality of transmitting antennas 109 are arranged and in a second direction (e.g. a vertical direction) that is orthogonal to the first direction. The configuration spacings between receiving antennas 202 in the first direction include the configuration spacing ($d_H$) between transmitting subarrays and a value that is equal to or greater than a value ($d_H \times N$) obtained by multiplying the configuration spacing between transmitting subarrays by the number (N) of transmitting subarrays. This causes the plurality of receiving antennas 202 to include antennas located in different positions both in the horizontal direction and in the vertical direction. This allows the radar apparatus 10 to form a direction-of-arrival estimation both in the horizontal direction and in the elevation angle direction.

Furthermore, in Embodiment 2, the radar apparatus 10 performs a direction-of-arrival estimation process through a plurality of virtual antenna elements (i.e. a virtually planarly arranged array antenna) interpolated by an interpolation process on the antenna elements constituting the virtual receiving array. This allows the radar apparatus 10 to better suppress side lobes through the antenna elements virtually placed at regular spacings. Further, the radar apparatus 10 can virtually increase the aperture length of the array antenna and therefore can improve angular resolution.

Embodiment 3

Those components of a radar apparatus according to Embodiment 3 which are identical to those of the radar apparatus 10 according to Embodiment 1 are described with reference to FIG. 1.

It should be noted that Embodiment 3 is similar to Embodiments 1 and 2 in that adjacent transmitting subarrays are provided so as to share at least one transmitting antenna 109 with each other.

Example Antenna Arrangement 7

In Example Antenna Arrangement 1, the receiving antennas 202 are placed at regular spacings in a predetermined direction (e.g. a horizontal direction). Meanwhile, in Example Antenna Arrangement 7, the receiving antennas 202 are placed at irregular spacings in a predetermined direction.

FIGS. 17A to 17C show examples of an arrangement of transmitting subarrays, an arrangement of receiving antennas 202, and an arrangement of a virtual receiving array, respectively, in Example Antenna Arrangement 7.

Example Antenna Arrangement 7 shows an antenna arrangement in which the number N of transmitting subarrays is 2 and the number Nsa of transmitting antennas 109 that each of the transmitting subarrays includes is 3.

As shown in FIG. 17A, four transmitting antennas #1 to #4 are placed at regular spacings of a predetermined value $d_H$ in a predetermined direction (i.e. a horizontal direction). Further, as shown in FIG. 17A, each of the transmitting subarrays #1 and #2 includes the same number (3 (=Nsa)) of transmitting antennas 109. Further, the adjacent transmitting subarrays share (Nsa−1)=2 transmitting antennas 109 (in FIG. 17A, the transmitting antennas #2 to #3) with each other.

Further, in FIG. 17A, the transmitting subarray spacing between the transmitting subarrays #1 and #2 is $d_H$.

Further, as shown in FIG. 17B, the number of receiving antennas 202 is 3 (=Na). Note here that the interelement spacings between receiving antennas 202 take on relatively prime values that are equal to or greater than a value ($d_H \times N$) obtained by multiplying the transmitting subarray spacing $d_H$ by the number N of transmitting subarrays. In FIG. 17B, N=2, and the interelement spacings between receiving antennas 202 are $2d_H$ and $3d_H$, which are equal to or greater than $2d_H$ and relatively prime to each other. That is, in FIG. 17B, the receiving antennas #1 to #3 are placed at irregular spacings $2d_H$ and $3d_H$.

Further, as shown in FIG. 17C, the virtual receiving array obtained by the arrangement of transmitting subarrays of FIG. 17A and the arrangement of receiving antennas of FIG. 17B includes 6 (=N×Na=(2×3)) antenna elements. The antenna element numbers of the virtual receiving array shown in FIG. 17C (i.e. #1, #2, #3, #4, #5, and #6, which are arranged in this order from the negative direction of the X axis toward the positive direction of the X axis) indicate numbers corresponding to the order of elements of the virtual receiving array correlation vector h(k, fs, w) shown in Eq. (4). The direction estimator 214 performs a direction estimation process with the virtual receiving array correlation vector h(k, fs, w), which represents signals received by the virtual receiving array shown in FIG. 17C.

Since the virtual receiving array shown in FIG. 17C includes 6 (=N×Na) antenna elements, has its transmitting subarrays placed at spacings $d_H$ as shown in FIG. 17A, and has its receiving antennas 202 placed at spacings $2d_H$ and $3d_H$ as shown in FIG. 17B, the antennas of the virtual receiving array shown in FIG. 17C are placed at spacings that are equal to or greater than the transmitting subarray spacing $d_H$.

For example, in a case where $d_H=0.5\lambda$ with respect to the wavelength λ of a carrier frequency, each of the transmitting subarrays has a size of not smaller than $2d_H$ (i.e. one wavelength). Note, however, that by placing adjacent transmitting subarrays so that the adjacent transmitting subarrays share transmitting antennas 109 with each other as shown in FIG. 17A, the transmitting subarray spacing ($d_H$) can be made narrower than the size ($2d_H$) of each of the transmitting subarrays.

It should be noted that by placing the transmitting subarrays (FIG. 17A) and the receiving antennas (FIG. 17B) as stated above, the six antenna elements of the virtual receiving array are placed at spacings $d_H$ and $2d_H$. For this reason, for example in a case where $d_H=0.5\lambda$, use of the virtual receiving array causes the radar apparatus 10 to make estimation errors in radar positioning due to the inclusion of a direction in which the side-lobe level becomes higher in the range of ±90 degrees.

The radar receiver 200 may perform a direction estimation process with the direction estimator 214a (FIG. 12), described in Embodiment 2, in order to lower the grating-lobe and side-lobe levels in angular directions so that the occurrence of such estimation errors in radar positioning is reduced.

It should be noted that although Embodiment 2 has described a virtually planarly arranged array antenna configured on the basis of a virtual receiving array, it can also be applied even in a case where the transmitting antennas 109 and the receiving antennas 202 are arranged in one direction that is either a horizontal direction or a vertical direction, and in that case, the direction estimator 214a becomes capable of direction-of-arrival estimation in the azimuth direction or the elevation angle direction.

Figure 18:
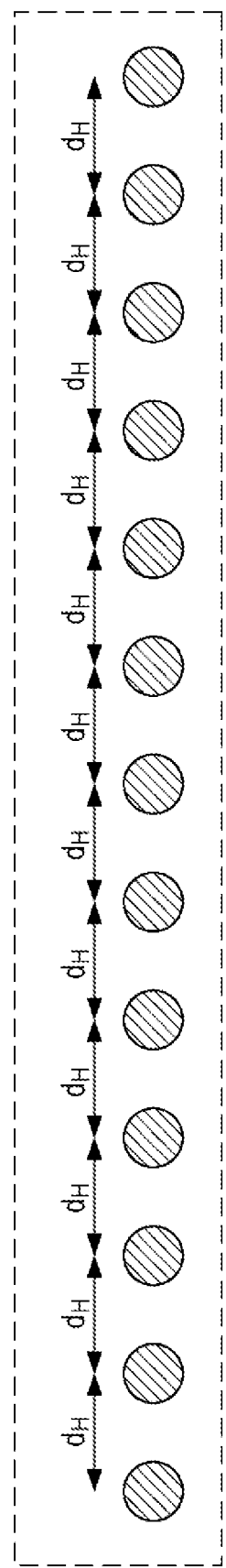
FIG. 18 shows an example arrangement of a virtually planarly arranged array antenna according to Example Antenna Arrangement 7.

FIG. 18 shows a virtually planarly arranged array antenna configured by using the configuration of an MIMO radar and arrangement of a virtual receiving array of Example Antenna Arrangement 7 (FIGS. 17A to 17C). For example, in FIG. 18, the virtually planarly arranged array antenna, based on the virtual receiving array having 6 (=N×Na) antenna elements in Example Antenna Arrangement 7, is configured, assuming that the antenna elements are virtually located in positions respectively indicated by six interelement vectors $D(n_{va}^{(t)}, 1), D(n_{va}^{(t)}, 2), D(n_{va}^{(t)}, 6)$. Since $n_{va}^{(t)}=1, \ldots, 6$ (=N×Na), the number of virtual antenna elements is 36 (=6×6), unless the positions respectively indicated by the six interelement vectors $D(n_{va}^{(t)}, 1), D(n_{va}^{(t)}, 2), \ldots, D(n_{va}^{(t)}, 6)$ overlap. Note, however, that, in FIG. 18, the number of virtual antenna elements is 13, as the positions indicated by the interelement vectors partially overlap.

The thirteen antenna elements of such a virtually planarly arranged array antenna as that shown in FIG. 18 are placed at regular spacings $d_H$ in a horizontal direction. With this, for example in a case where $d_H=0.5\lambda$, the radar apparatus 10 becomes able to, by using the virtually planarly arranged array antenna shown in FIG. 18, form a direction-of-arrival estimation with reduced occurrence of grating lobes in a range of ±90 degrees, thus bringing about an effect of reducing estimation errors in radar positioning.

Example Antenna Arrangement 8

Example Antenna Arrangement 8 describes a case where different pairs of adjacent transmitting subarrays share different numbers of transmitting antennas 109 with each other. For example, in Example Antenna Arrangement 8, the transmitting subarrays are placed at irregular spacings in a predetermined direction.

FIGS. 19A to 19C show examples of an arrangement of transmitting subarrays, an arrangement of receiving antennas 202, and an arrangement of a virtual receiving array, respectively, in Example Antenna Arrangement 8.

Example Antenna Arrangement 8 shows an antenna arrangement in which the number N of transmitting subarrays is 3 and the number Nsa of transmitting antennas 109 that each of the transmitting subarrays includes is 3.

As shown in FIG. 19A, six transmitting antennas 109 are placed at regular spacings of a predetermined value $d_H$ in a predetermined direction (i.e. a horizontal direction). Further, as shown in FIG. 19A, each of the transmitting subarrays #1 and #3 includes the same number (3 (=Nsa)) of transmitting antennas 109. The transmitting antennas #1, #2, #3, #4, #5, and #6 are provided in this order from the negative direction of the X axis of FIG. 19A toward the positive direction of the X axis. Further, adjacent transmitting subarrays share at least one transmitting antenna with each other. In FIG. 19A, as for the number of transmitting antennas 109 that adjacent transmitting subarrays share with each other, the transmitting subarrays #1 and #2 share two transmitting antennas 109 (i.e. the transmitting antennas #2 and #3), and the transmitting subarrays #2 and #3 share one transmitting antenna 109 (i.e. the transmitting antenna #4). That is, the plurality of transmitting subarrays include different pairs of adjacent transmitting subarrays sharing different numbers of transmitting antennas 109.

Further, in FIG. 19A, the transmitting subarray spacing between the transmitting subarrays #1 and #2 is $d_H$, and the transmitting subarray spacing between the transmitting subarrays #2 and #3 is $2d_H$. That is, the transmitting subarrays #1 to #3 are placed at irregular spacings.

Further, as shown in FIG. 19B, the number of receiving antennas 202 is 3 (=Na). Further, the interelement spacings between receiving antennas 202 are wider than the sum of transmitting subarray spacings $d_H$. Since the sum of transmitting subarray spacings is $3d_H(=d_H+2d_H)$ in FIG. 19A, the interelement spacings between receiving antennas 202 are $4d_H$ in FIG. 19B.

Further, as shown in FIG. 19C, the virtual receiving array obtained by the arrangement of transmitting subarrays of FIG. 19A and the arrangement of receiving antennas of FIG. 19B includes 9 (=N×Na=(3×3)) antenna elements. The antenna element numbers of the virtual receiving array shown in FIG. 19C (i.e. #1, #2, #3, #4, #5, #6, #7, #8, and #9, which are arranged in this order from the negative direction of the X axis toward the positive direction of the X axis) indicate numbers corresponding to the order of elements of the virtual receiving array correlation vector h(k, fs, w) shown in Eq. (4). The direction estimator 214 performs a direction estimation process with the virtual receiving array correlation vector h(k, fs, w), which represents signals received by the virtual receiving array shown in FIG. 19C.

Since the virtual receiving array shown in FIG. 19C includes 9 (=N×Na) antenna elements and has its transmitting subarrays placed at irregular spacings as shown in FIG. 19A, the antenna elements of the virtual receiving array shown in FIG. 19C are placed at spacings that are equal to or greater than the transmitting subarray spacing $d_H$.

For example, in a case where $d_H=0.5\lambda$ with respect to the wavelength λ of a carrier frequency, each of the transmitting subarrays has a size of not smaller than $2d_H$ (i.e. one wavelength). Note, however, that by placing adjacent transmitting subarrays so that the adjacent transmitting subarrays share a transmitting antenna(s) 109 with each other as shown in FIG. 19A, the transmitting subarray spacing ($d_H$) can be made narrower than the size ($2d_H$) of each of the transmitting subarrays.

It should be noted that by placing the transmitting subarrays (FIG. 19A) and the receiving antennas (FIG. 19B) as stated above, the nine antenna elements of the virtual receiving array are placed at spacings $d_H$ and $2d_H$. For this reason, for example in a case where $d_H=0.5\lambda$, use of the virtual receiving array causes the radar apparatus 10 to make estimation errors in radar positioning due to the inclusion of a direction in which the side-lobe level becomes higher in the range of ±90 degrees.

In such a case where there occur estimation errors in radar positioning, the radar receiver 200 may perform a direction estimation process with the direction estimator 214a (FIG. 12), described in Embodiment 2, in order to lower the grating-lobe and side-lobe levels in angular directions.

It should be noted that although Embodiment 2 has described a virtually planarly arranged array antenna configured on the basis of a virtual receiving array, it can also be applied even in a case where the transmitting antennas 109 and the receiving antennas 202 are arranged in one direction that is either a horizontal direction or a vertical direction, and in that case, the direction estimator 214a becomes capable of direction-of-arrival estimation in the azimuth direction or the elevation angle direction.

Figure 20:
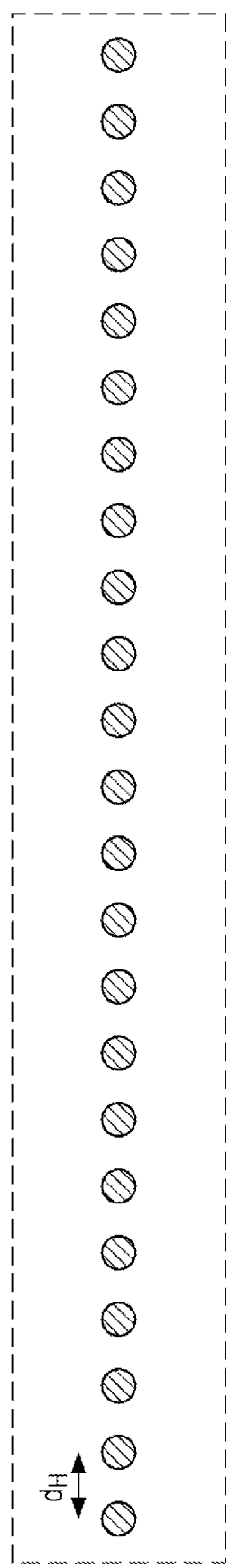
FIG. 20 shows an example arrangement of a virtually planarly arranged array antenna according to Example Antenna Arrangement 8.

FIG. 20 shows a virtually planarly arranged array antenna configured by using the configuration of an MIMO radar and arrangement of a virtual receiving array of Example Antenna Arrangement 8 (FIGS. 19A to 19C). Specifically, in FIG. 20, the virtually planarly arranged array antenna, based on the virtual receiving array having 9 (=N×Na) antenna elements in Example Antenna Arrangement 8, is configured, assuming that the antenna elements are virtually located in positions respectively indicated by nine interelement vectors $D(n_{va}^{(t)}, 1)$, $D(n_{va}^{(t)}, 2)$, ..., $D(n_{va}^{(t)}, 9)$. Since $n_{va}^{(t)}=1, ..., 9$ (=N×Na), the number of virtual antenna elements is 81 (=9×9), unless the positions respectively indicated by the nine interelement vectors $D(n_{va}^{(t)}, 1)$, $D(n_{va}^{(t)}, 2)$, ..., $D(n_{va}^{(t)}, 9)$ overlap. Note, however, that, in FIG. 20, the number of virtual antenna elements is 23, as the positions indicated by the interelement vectors partially overlap.

The twenty-three antenna elements of such a virtually planarly arranged array antenna as that shown in FIG. 20 are placed at regular spacings $d_H$, for example, in a horizontal direction. With this, for example in a case where $d_H=0.5\lambda$, the radar apparatus 10 becomes able to, by using the virtually planarly arranged array antenna shown in FIG. 20, form a direction-of-arrival estimation with reduced occurrence of grating lobes in a range of ±90 degrees, thus bringing about an effect of reducing estimation errors in radar positioning.

The foregoing has described Example Antenna Arrangements 7 and 8 according to Embodiment 3.

Thus, in Embodiment 3, the receiving antennas 202 (Example Antenna Arrangement 7) or the transmitting subarrays (Example Antenna Arrangement 8) are placed at irregular spacings in a predetermined direction. This makes it possible to further enlarge the aperture of the virtual receiving array that is determined by the positions in which the receiving antennas 202 or the transmitting subarrays are located in the radar apparatus 10, thus making it possible to enhance angular resolution. This also makes it possible to form a direction-of-arrival estimation with the direction estimator 214a operating to prevent grating lobes from occurring due to the irregular spacing arrangement, thus making it possible to reduce detection errors.

Furthermore, in Embodiment 3, as in Embodiment 2, the radar apparatus 10 performs a direction-of-arrival estimation process through a virtually planarly arranged array antenna. With this, even in a case where the receiving antennas 202 or the transmitting subarrays are placed at irregular spacings, the radar apparatus 10 can suppress side lobes or grating lobes through antenna elements virtually placed at regular spacings. Further, the radar apparatus 10 can virtually increase the aperture length of the array antenna and therefore can improve angular resolution.

The foregoing has described embodiments according to an aspect of the present disclosure.

It should be noted that a proper combination of operations according to the embodiments may be implemented.

Other Embodiments (1) The number of transmitting antennas 109, the number of receiving antennas 202, the number of transmitting subarrays, the number of transmitting antennas 109 that each of the transmitting subarrays includes, or the number of transmitting antennas 109 that adjacent transmitting subarrays share with each other is not limited to the numbers described in the foregoing embodiments. Further, the predetermined direction in which transmitting antennas 109 or receiving antennas 202 are arranged is not limited to a horizontal direction or a vertical direction.

(2) Although the foregoing embodiments have described cases where a coded pulse radar is used, the present disclosure is also applicable to a radar system, such as a chirp pulse radar, that uses frequency-modulated pulse waves.

(3) In the radar apparatus 10 shown in FIG. 1, the radar transmitter 100 and the radar receiver 200 may be individually placed in physically separated places.

(4) Although not illustrated, the radar apparatus 10 includes, for example, a central processing unit (CPU), a storage medium (read-only memory (ROM)) storing a control program, and a working memory (random-access memory (RAM)). In this case, the functions of the components described above are achieved by the CPU executing the control program. Note, however, that the radar apparatus 10 is not limited in hardware configuration to such an example. For example, the functional components of the radar apparatus 10 may be achieved as ICs (integrated circuits). These functional components may take the form of individual single chips or of a single chip including some or all of the functional components.

In the foregoing, various embodiments have been described with reference to the drawings. However, the present disclosure is of course not limited to such examples. It is apparent that persons skilled in the art can conceive of various changes and alterations within the scope of claims, and such changes and alterations are naturally understood as pertaining to the technical scope of the present disclosure. Each constituent element in the embodiment described above may be arbitrarily combined with the other without departing from the spirit of the disclosure.

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

Summary of the Present Disclosure

A radar apparatus of the present disclosure includes: a radar transmitter that transmits a plurality of radar signals while switching among a plurality of transmitting subarrays; and a radar receiver that receives reflected-wave signals produced by the plurality of radar signals being reflected by a target, the plurality of radar signals being transmitted from the respective transmitting subarrays. In the radar apparatus of the present disclosure, each of the plurality of transmitting subarrays includes a plurality of transmitting antennas, and adjacent ones of the plurality of transmitting subarrays share at least one of the plurality of transmitting antennas with each other.

In the radar apparatus of the present disclosure, each of the plurality of transmitting subarrays includes a plurality of phase shifters corresponding to the plurality of transmitting antennas, respectively.

In the radar apparatus of the present disclosure, the radar receiver includes a plurality of receiving antennas, and a configuration spacing between adjacent ones of the plurality of receiving antennas takes on a value that is equal to or greater than a value obtained by multiplying a configuration spacing between the adjacent transmitting subarrays by the number of transmitting subarrays.

In the radar apparatus of the present disclosure, the plurality of receiving antennas are placed at irregular configuration spacings in a predetermined direction.

In the radar apparatus of the present disclosure, the plurality of receiving antennas are placed at relatively prime configuration spacings in a predetermined direction.

In the radar apparatus of the present disclosure, the plurality of receiving antennas are placed at configuration spacings that are wider than a sum of the transmitting subarray configuration spacings.

In the radar apparatus of the present disclosure, the plurality of transmitting subarrays are placed at irregular configuration spacings in a predetermined direction.

In the radar apparatus of the present disclosure, the radar receiver includes a plurality of receiving antennas, one or more of the plurality of receiving antennas is/are arranged in a first direction in which the plurality of transmitting antennas are arranged and a remaining one(s) of the plurality of receiving antennas is/are arranged in a second direction that is orthogonal to the first direction, and configuration spacings between adjacent ones of the plurality of receiving antennas in the first direction include a configuration spacing that is identical to a configuration spacing between the transmitting subarrays and a configuration spacing that takes on a value that is equal to or greater than a value obtained by multiplying the configuration spacing between the transmitting subarrays by the number of transmitting subarrays.

In the radar apparatus of the present disclosure, the radar receiver includes a plurality of receiving antennas and a virtual receiving array including a plurality of virtual antenna elements whose number is equal to the product of the number of transmitting subarrays and the number of receiving antennas, and the radar receiver estimates a direction of arrival of the plurality of radar signals through the plurality of virtual antenna elements interpolated by an interpolation process on the plurality of antenna elements.

The present disclosure is applicable as a radar apparatus that performs detection in a wide angular range.

What is claimed is:

1. A radar apparatus comprising:
   a radar transmitter that transmits a plurality of radar signals using a plurality of transmitting antennas while switching among a plurality of transmitting subarrays; and
   a radar receiver that receives reflected-wave signals produced by the plurality of radar signals being reflected by a target, the plurality of radar signals being transmitted from the respective transmitting subarrays,
   wherein each of the plurality of transmitting subarrays includes two or more of the plurality of transmitting antennas,
   wherein adjacent ones of the plurality of transmitting subarrays share each of the plurality of transmitting antennas except at least one of the plurality of transmitting antennas with each other, and
   wherein each of the plurality of transmitting subarrays is controlled so that a main beam of the radar transmitter is oriented in a predetermined direction.

2. The radar apparatus according to claim 1, wherein each of the plurality of transmitting subarrays includes a plurality of phase shifters corresponding to the plurality of transmitting antennas, respectively.

3. The radar apparatus according to claim 1, wherein the radar receiver includes a plurality of receiving antennas, and a configuration spacing between adjacent ones of the plurality of receiving antennas is equal to or greater than a configuration spacing between the adjacent ones of the plurality of transmitting subarrays multiplied by a number of transmitting subarrays.

4. The radar apparatus according to claim 1, wherein the radar receiver includes a plurality of receiving antennas, and
   a first pair of adjacent ones of the plurality of receiving antennas has a first configuration spacing and a second pair of the adjacent ones of the receiving antennas has a second configuration spacing in a predetermined direction.

5. The radar apparatus according to claim 4, wherein dimensions of the first configuration spacing and the second configuration spacing are multiples of prime numbers.

6. The radar apparatus according to claim 1, wherein the radar receiver includes a plurality of receiving antennas,
   the adjacent ones of the plurality of transmitting subarrays are arranged at a plurality of transmitting subarray configuration spacings, and
   adjacent ones of the plurality of receiving antennas are arranged at a configuration spacing that is wider than a sum of the plurality of transmitting subarray configuration spacings.

7. The radar apparatus according to claim 1, wherein the adjacent ones of the plurality of transmitting subarrays are arranged at a plurality of configuration spacings in a predetermined direction.

8. The radar apparatus according to claim 1, wherein the radar receiver includes a plurality of receiving antennas,
   two or more of the plurality of receiving antennas are arranged in a first direction in which the plurality of transmitting antennas are arranged and the plurality of receiving antennas other than the two or more of the plurality of receiving antennas are arranged in a second direction that is orthogonal to the first direction, and
   configuration spacings between adjacent ones of the plurality of receiving antennas in the first direction include a first configuration spacing that is identical to a configuration spacing between the adjacent ones of the transmitting subarrays and a second configuration spacing that is equal to or greater than the configuration spacing between the adjacent ones of the transmitting subarrays multiplied by a number of transmitting subarrays.

9. The radar apparatus according to claim 1, wherein the radar receiver includes a plurality of receiving antennas and a virtual receiving array including a plurality of virtual antenna elements whose number is equal to the product of the number of transmitting subarrays and the number of receiving antennas, and
   the radar receiver estimates a direction of arrival of the plurality of radar signals through the plurality of virtual antenna elements interpolated by an interpolation process on the plurality of antenna elements.

* * * * *